United States Patent
Sleichter, III et al.

(10) Patent No.: US 6,744,370 B1
(45) Date of Patent: Jun. 1, 2004

(54) VIBRO-TACTILE ALERT AND MASSAGING SYSTEM HAVING DIRECTIONALLY ORIENTED STIMULI

(75) Inventors: Charles G. Sleichter, III, Dana Point, CA (US); Stanley Cutler, Van Nuys, CA (US); Gayle B. Gerth, Dana Point, CA (US); Alton B. Otis, Jr., Port Townsend, WA (US); Taylor Chau, Cerritos, CA (US)

(73) Assignee: InSeat Solutions, LLC, Santa Fe Springs, CA (US)

( * ) Notice: Subject to any disclaimer, the term of this patent is extended or adjusted under 35 U.S.C. 154(b) by 0 days.

(21) Appl. No.: 09/352,429

(22) Filed: Jul. 13, 1999

Related U.S. Application Data

(63) Continuation-in-part of application No. 09/081,402, filed on May 18, 1998, now Pat. No. 6,087,942.

(51) Int. Cl.[7] ............................................. G08B 23/00
(52) U.S. Cl. ........................ 340/576; 340/575; 601/49
(58) Field of Search .............................. 601/49, 86, 87, 601/90, 91, 97, 98, 101, 150; 340/575, 576, 573.1, 539; 600/549

(56) References Cited

U.S. PATENT DOCUMENTS

| | | | | |
|---|---|---|---|---|
| 3,878,838 A | * | 4/1975 | Lunn | 128/63 |
| 4,785,280 A | * | 11/1988 | Fubini | 340/383 |
| 5,437,608 A | * | 8/1995 | Cutler | 601/49 |
| 5,462,515 A | * | 10/1995 | Tseng | 601/57 |
| 5,581,238 A | * | 12/1996 | Chang | 340/573 |
| 5,585,785 A | * | 12/1996 | Gwin | 340/575 |
| 5,857,986 A | * | 1/1999 | Moriyasu | 601/49 |
| 5,926,114 A | * | 7/1999 | Andrews | 340/909 |
| 6,014,572 A | * | 1/2000 | Takahashi | 455/567 |
| 6,087,942 A | * | 7/2000 | Sleichter | 340/576 |

* cited by examiner

Primary Examiner—Anh V La
(74) Attorney, Agent, or Firm—Fulwider Patton Lee & Utecht, LLP

(57) ABSTRACT

A vibro-tactile cutaneous alert stimulation and massaging system for equipment such as a vehicle includes a pad; a heater element, and motorized vibrators in respective regions of the pad; a plurality of vibratory transducers for location relative to plural zones of the seat, each transducer being responsive to a transducer power signal; a microprocessor controller having program and variable memory and an input and output interface; an array of input elements connected to the input interface for signaling the microprocessor in response to operator input, the signaling including an intensity control value, a plurality of mode signals, and a plurality of region signals relating transducers to be enabled; and a driver circuit responsive to the output interface for producing the power signal separately for each of the transducers. The controller responds to the input elements to activate the transducers in: a massaging mode selectively producing activation of the drive signals at adjustable intensity corresponding to the intensity control value; and an alert mode producing a predetermined sequence of vibro-tactile cutaneous alert stimulation cycles, each alert stimulation cycle having idle portion between 1 and 30 seconds, and an active portion of sufficient duration, frequency, and intensity for selectively stimulating the muscle groups of the driver for improving the driver's alertness, the intensity of vibration in the alert mode being greater than the maximum intensity in the massaging mode. Additional transducers can be spaced along a restraining seat belt for imparting directionally oriented stimuli warning of an impending collision. Also disclosed are methods for alerting a vehicle driver and for tactile-signaling a directionally oriented external condition to a vehicle driver or occupant.

59 Claims, 15 Drawing Sheets

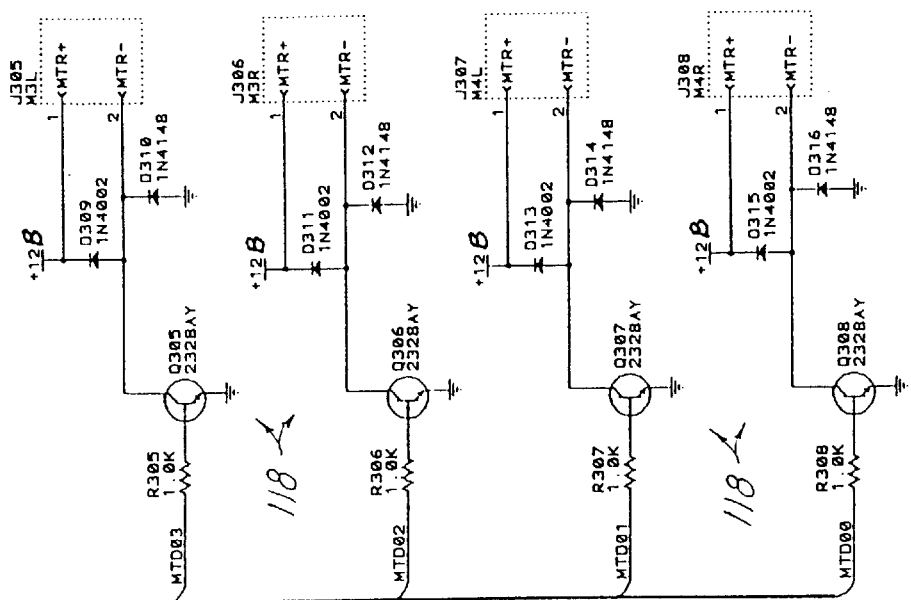
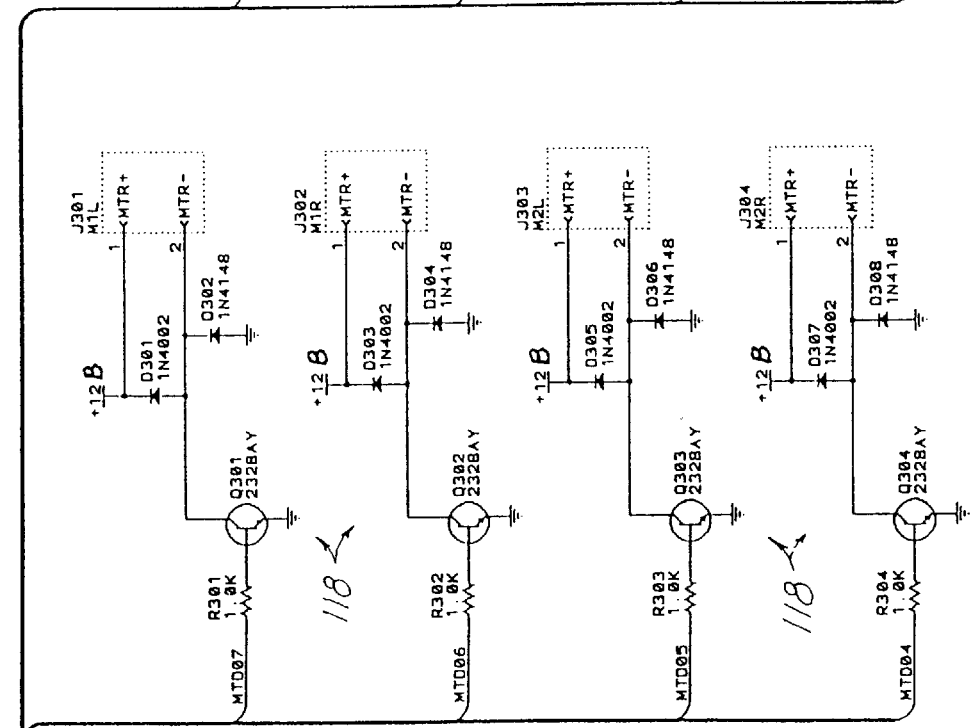
Fig. 13B

VIBRO-TACTILE ALERT AND MASSAGING SYSTEM HAVING DIRECTIONALLY ORIENTED STIMULI

RELATED APPLICATION

This application is a continuation-in-part of application Ser. No. 09/081,402, filed on May 18, 1998, now U.S. Pat. No. 6,087,942 which is incorporated herein by this reference.

An original compact disc (Copy 1) and a duplicate compact disc (Copy 2) each having a file named "57163.txt" (created on Jan. 25, 2002 and being 154,518 bytes in size) that contains a computer program assembly listing in Samsung Assembly Language (Appendix A)are filed with and as a part of this application and are incorporated by reference herein. The assembly listing in Appendix A is subject to copyright protection. The copyright owner has no objection to the reproduction of Appendix A or the patent disclosure, as it appears in the U.S. Patent and Trademark Office files, but otherwise reserves all copyright rights whatsoever.

BACKGROUND

The present invention relates to devices for preventing sleeping or dozing of equipment operators such as vehicle drivers, to massaging devices, and to devices for communicating equipment functional conditions to operators thereof.

Sleep prevention devices are known, being disclosed for example in U.S. Pat. No. 3,938,123 to Warner, U.S. Pat. No. 4,023,098 to Muncheryan, U.S. Pat. No. 4,059,830 to Threadgill, U.S. Pat. No. 4,354,179 to Fourcade, and U.S. Pat. No. 5,585,785 to Gwin et al. The Warner patent discloses headgear having a battery-powered buzzer that sounds with increasing intensity until the wearer shakes his head. The Muncheryan patent discloses a dash-mountable circuit unit having a rheostat connected in series with battery power and a pair of output jacks, and a toggle switch for selectively disconnecting the power or connecting an interrupter in series with the power. The Threadgill patent discloses electrical contacts that are worn on adjacent fingers and biased toward contact for closing a circuit when the user relaxes, the circuit activating a buzzer or other stimulator for awakening the user. The Fourcade patent discloses an ear prosthesis having an adjustable mercury switch that closes an alarm circuit when the user's head reaches an abnormal inclination. The Gwin et al. patent discloses a force-sensitive transducer that variably feeds a microprocessor, the microprocessor activating an alarm when the force falls below a low limit that is established in an initial period of operation. Also proposed, but not described, is monitoring of transient behavior in a manner used for monitoring steering wheel oscillations. The above devices are unsatisfactory for a number of reasons. For example:

1. The headgear of Warner requires unnatural repetitive head motion to prevent false alarms;
2. The ear prosthesis of Fourcade is ineffective in that sleep can occur in normal head orientations, and false alarms can result from vehicle accelerations;
3. The device of Muncheryan is ineffective for improving or maintaining a driver's alertness in that uniform vibration and regular interruptions of vibratory action promote habituation, the vibratory action being progressively ignored by the user, and it is believed that relaxation by regular massaging of a limited fixed set of muscle groups only at reduced intensity tends to promote drowsiness;
4. The Threadgill device is awkward to use in that the user must actively and continuously force his fingers apart; and
3. The Gwin et al. system is ineffective in that a driver can set an abnormally low threshold by intentionally using very little force during the first 15 seconds of operation; also, it is believed that there is no enabling disclosure of the use of transients in measured gripping force for detecting drowsiness.

Typical warning systems of the prior art use visual or auditory indications of sensed conditions for initiating appropriate human responses in the nature of corrective action. For example, vehicle fuel gauges are commonly provided with warning lights that are activated when the supply reaches a low threshold, and aircraft have audible warnings of dangerous conditions such as an impending stall at low speed. Visual indications are often ineffective when used alone, in that they might not be noticed. Auditory indications can be ineffective in noisy environments, particularly when the user is hearing-impaired, and they can be objectionable when the indication does not require immediate corrective action.

Recent developments in massaging apparatus have produced a variety of products incorporating plural vibration transducers that operate in multiple modes. However, none is particularly suited for improving or maintaining a driver's alertness as desired for the reasons discussed above.

Thus there is a need for a vibro-tactile alert system that overcomes the disadvantages of the prior art, and that is reliable, easy to operate and inexpensive to produce.

SUMMARY

The present invention provides a tactile alert system having an irregular sequence of alert stimulation cycles that are generated using vibratory transducer motors. The motors are embedded in structure supporting a user, such as a vehicle driver's seat. The seat may also contain an embedded heater to enhance the effectiveness of the vibrations. The system, which can be powered from vehicle battery power, can be activated manually or by various signal indications of drowsiness, and it can be configured for interacting with a vehicle electrical system to provide auxiliary status indications and remote control of vehicle functions. In its fullest implementation, the system provides effective massaging of selected muscle groups of the user, and stimulation in response to alarm conditions such as overheating. As used herein, the term "tactile" is understood to mean vibro-tactile, and the term "tactile stimulation" is understood to mean vibro-tactile cutaneous stimulation.

In one aspect of the invention, a tactile alert system for an occupant support structure includes a plurality of vibratory transducers for location in plural zones of the support structure; a driver circuit for powering each of the transducers in response to a corresponding drive signal; and a controller responsive to external input for selectively activating the drive signals in a predetermined sequence of alert stimulation cycles of sufficient duration, frequency, and intensity for selectively stimulating muscle groups of an occupant of the structure, successive alert stimulation cycles differing in at least one of intensity, frequency, and transducers activated, thereby to improve the occupant's alertness.

The alert stimulation cycles can each have an active portion, and preferably at least some of the alert stimulation cycles also have an idle portion. The active portion durations can be between 1 second and 15 seconds, the idle portion durations being between 5 seconds and 45 seconds. The stimulation cycles can selectively include a pulse stimulation cycle wherein the controller activates the drive signals in spaced interval portions of the active portions. The interval portions can have an interval duration being between 0.1 second and 1.0 seconds, activated ones of the transducers producing a vibration frequency of at least 50 Hz in each of the alert stimulation cycles. Preferably the frequency is greater than 80 HZ in at least some of the alert stimulation cycles. The system can include respective left and right transducers in at least some of the zones the alert stimulation cycles further including at least one stimulation cycle selected from the group consisting of an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

Successive alert stimulation cycles can further differ in at least one of active portion duration and idle portion duration. The active portion duration can be between 1 second and 10 seconds, some of the idle portion durations being between 5 seconds and 15 seconds, others of the idle portion durations being between 15 seconds and 45 seconds. The active portion duration can be approximately 5 seconds, the idle portion durations alternating between approximately 10 seconds and approximately 25 seconds.

The stimulation cycles can include at least one stimulation cycle selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers. The alert stimulation cycles preferably include at least three members of the group for avoiding habituation to the cycles by the user.

The external input can include an alert input selected from the group consisting of a manual actuator input, a bodily function sensor input, a manual control sensor input, and an external system signal. The support structure can include a pad for contacting a portion of the user, the vibratory transducers being imbedded in the pad. The support structure can further include a seat belt for restraining the user in the seat, at least some of the vibratory transducers being supportable outside of the pad in longitudinally spaced relation proximate the belt.

In another aspect of the invention, a tactile alert system for a user support structure includes a vibratory transducer for location in the support structure; the driver circuit for powering the transducer in response to a drive signal; and the controller responsive to external input for selectively activating the drive signal in a predetermined sequence of alert stimulation cycles of sufficient duration, frequency, and intensity for stimulating muscle tissue of a user of the structure thereby to improve the user's alertness, each alert stimulation cycle having an active portion and an idle portion, wherein successive alert stimulation cycles differ in at least one of intensity, frequency, active portion duration, and idle portion duration. The system can further include a radio receiver having an output for communicating the bodily function input in response to a remote bodily function sensor. The system can further include a sensor unit having a carrier having means for attachment to a body member of the user; an transducer supported by the carrier for generating a sensor signal corresponding to a bodily function of the user, the transducer being selected from the group consisting of a blood pulse sensor, a blood pressure sensor, a body temperature sensor, and an EEG sensor; and a radio transmitter supported by the carrier for communicating the sensor signal to the radio receiver.

Preferably the system further includes a plurality of input elements connected to the controller for signaling operating input, the signaling including signals for setting a plurality of operating modes, one of the operating modes being an alert mode incorporating the alert stimulation cycles, and signals for setting an intensity control value, wherein the controller activates the drive signals at maximum intensity during at least a portion of the alert mode, and at adjustable intensity corresponding to the intensity control value in at least one other mode for soothingly massaging the muscle tissue of the user. The support structure can include a pad for contacting a portion of the user, the vibratory transducer being imbedded in the pad.

In a further aspect of the invention, a vehicle tactile alert system for an operator-driven vehicle having a driver's seat includes a plurality of vibratory transducers for location relative to plural zones of the seat, each transducer being responsive to a transducer power signal; a microprocessor controller having program and variable memory and an input and output interface; an array of input elements connected to the input interface for signaling the microprocessor in response to operator input, the signaling including an intensity control value, a plurality of mode signals, and a plurality of region signals relating transducers to be enabled; a driver circuit responsive to the output interface for producing, separately for each of the transducers, the power signal; and the microprocessor controller being operative in response to the input elements for activating the transducers for operation thereof in a plurality of modes including a massaging mode selectively producing activation of the drive signals at adjustable intensity corresponding to the intensity control value for soothingly massaging muscle groups of the driver; and an alert mode producing a predetermined sequence of alert stimulation cycles, each alert stimulation cycle having an idle portion of between 1 second and 30 seconds, and an active portion of sufficient duration, frequency, and intensity for selectively stimulating the muscle groups of the driver thereby to improve the driver's alertness, wherein successive alert stimulation cycles differ in at least one of intensity, frequency, active portion duration, idle portion duration, and transducers enabled.

Preferably the driver circuit produces a first maximum level of the power signal in the massaging mode and a second level of the power signal in the alert mode, the second level being greater than the first maximum level for enhanced effectiveness of the alert stimulation cycles. The system can be operable powered from an external power source voltage, the driver circuit being powered substantially at the source voltage in the massaging mode, the system further including a power boost circuit for powering the driver circuit at an elevated boost voltage in the alert mode. Preferably the boost voltage is at least 50 percent greater than the source voltage for facilitating perception of the alert mode. The external electrical power can be DC, the power boost circuit including an inductor and a diode series connected between the driver circuit and the external electrical power, and a pulse circuit connected between the inductor and the diode, the pulse circuit being activated during the alert mode to produce the elevated boost voltage.

The active portion durations can be between 1 second and 30 seconds. The system can include respective left and right transducers in at least some of the zones, the alert stimulation cycles including at least three stimulation cycles selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers. The pulse cycle interval portions during the alert stimulation cycles can have an interval duration being between 0.1 second and 1.0 seconds, activated ones of the transducers producing a vibration frequency of at least 50 Hz in each of the alert stimulation cycles. Preferably the vibration frequency is greater than 80 Hz in at least some of the alert stimulation cycles for enhanced tactile stimulation.

The input interface can be adapted for receiving an external signal selected from the group consisting of a manual actuator input, a bodily function sensor input, an manual control sensor input, and an external system signal. The external signal can include the manual actuator input, the microprocessor activating the alert mode in response to the manual actuator input. The external signal can include the bodily function input, the microprocessor detecting a predetermined threshold condition of the bodily function input and activating the alert mode in response thereto. The external signal can include the manual control sensor input, the microprocessor activating a predetermined subset of the transducers corresponding to the manual control sensor input. The manual control sensor input can be a hand grip sensor signal, the microprocessor detecting a predetermined threshold condition of the hand grip sensor signal and activating the alert mode in response thereto.

The external signal can include the external system signal, the microprocessor activating a predetermined subset of the transducers corresponding to the external system signal. The external system signal can include a left turn signal and a right turn signal, the microprocessor activating respective left and right ones of the transducers in response to the left and right turn signals. The external system signal can include an alarm signal for activating an alarm mode in response thereto, wherein the transducers are activated in a manner sufficiently differing from other modes for the driver to identify occurrence the alarm mode. Preferably the microprocessor is implemented for excluding activation of any other mode during the alarm mode. Preferably the microprocessor includes program instructions for resuming a previously selected mode upon termination of the alarm mode. The external system signal can include a quantity signal of the group consisting of a coolant temperature signal, an oil pressure signal, a battery voltage signal, a tire pressure signal, and a fuel quantity signal, the alarm signal being activated when the quantity signal reaches a predetermined threshold condition.

The external system signal can include a directionally oriented warning signal having respective front, rear, right, and left directional components, the system including a belt assembly for enclosing and restraining a torso portion of the driver and having a longitudinally spaced belt subset of the transducers being locatable generally in a directional, plane containing a laterally spaced back pair of the transducers being-located in the seat, the back pair in combination with the belt subset of the transducers forming a ring subset surrounding the driver's torso when the belt assembly is in place, the microprocessor being operative for activating particular ones of the ring subset in response to the warning signal thereby to directionally stimulate the driver in correspondence with the directional components.

The mode signals can include at least two members of a mode signal group consisting of a select signal, a pulse signal, a wave signal, and a zig-zag signal, the microprocessor being operative in response to the signals of the mode signal group, respectively, for correspondingly activating: transducers in enabled zones corresponding to the region signals in a select massaging mode; enabled transducers in spaced intervals of time in a pulse massaging mode; enabled transducers in sequential zones in a wave massaging mode; and alternating left and right ones of the transducers in sequential zones in a zig-zag massaging mode. The signaling can further include a speed input for determining a rate of sequencing mode component intervals, and wherein, during at least one of the massaging modes, the duration of operation in sequential activation of mode segments being responsive to the speed control value.

The input elements can further define a heat control input, the system further including a heater element in the pad; a heater driver responsive to the output interface for powering the heater, the microprocessor being further operative in response to the input elements for activating the heater element, and wherein the composite mode, includes activation of the heater element. The driver's seat can include a pad for contacting a portion of the user, the vibratory transducers being imbedded in the pad.

In another and important aspect of the invention, a directionally oriented tactile alert massaging system for an operator-driven vehicle having a seat for supporting a driver of the vehicle, includes a plurality of vibratory transducers supported relative to the seat for stimulating corresponding body portions of the driver, each transducer being responsive to a transducer power signal; a microprocessor controller having program and variable memory and an input and output interface; the input interface being configured for receiving an external signal indicative of a sensed condition of the vehicle, the external signal having at least one directional component corresponding to a directional aspect of the sensed condition; a driver circuit responsive to the output interface for producing, separately for each of the transducers, the power signal; and the microprocessor controller being operative for activating particular ones of the transducers in response to the external signal thereby to directionally stimulate the driver in correspondence with the directional components in a first mode, and selectively activating at least some of the transducers in at least one other mode for soothingly massaging the muscle tissue of the user.

The external signal can include respective front, rear, right and left directional components, the system further including a translator for activating respective subsets of the transducers in response to each of the directional components. Preferably the translator is operative for activating additional subsets of the transducers in response to at least one combination of the directional components which can be front and right, rear and right, front and left, and rear and left directional components, for signifying a directional orientation intermediate that of individual components of the combination. The subsets can include overlapping pluralities of the transducers associated with adjacent directional aspects of the external signal for enhanced effectiveness of the tactile stimuli. The system can include a seat belt for the driver, directionally stimulating ones of the transducers including at least one in a back zone of the seat, and a longitudinally spaced plurality of the transducers proximate the seat belt. The external signal can be a collision warning signal, the directional component corresponding to a heading relative to a hazard object.

In another aspect of the invention, a method for alerting a vehicle driver includes the steps of:

(a) providing a plurality of vibratory transducers in plural zones of a driver's seat, a driver circuit connected to the transducers and having respective inputs for receiving corresponding drive signals, and a controller for producing the drive signals, the controller having an alert input;

(b) activating the alert input;

(c) operating the controller to produce the drive signals, in response to the alert input, in alert stimulation cycles of sufficient duration, frequency, and intensity for selectively stimulating muscle groups of the driver; and (d) sequencing plural cycle segments of the alert stimulation cycles, successive cycles varying in at least one of intensity, frequency, and transducers enabled, thereby to improve the driver's alertness.

The operating step can further include partitioning at least some of the cycle segments into an active portion of between 1 second and 15 seconds, and an idle portion of between 1 second and 15 seconds. The sequencing step can include the further step of varying successive cycle segments in at least one of active portion duration and idle portion duration.

In a further aspect of the invention, a method for tactile-signaling a directionally oriented external condition to a vehicle driver includes the steps of:

(a) supporting a spaced plurality of vibratory transducers relative to a driver's seat, at least some of the transducers being pointer transducers and spaced proximate a directional plane;

(b) providing a driver circuit connected to the transducers and having respective inputs for receiving corresponding drive signals, and a controller for producing the drive signals, the controller having a condition input for responding to the external condition and an associated direction thereof;

(c) activating the condition input;

(d) translating the condition input for enabling a directionally oriented subset only of the pointer transducers; and (e) operating the controller to produce the drive signals, in response to the condition input, in alarm stimulation cycles of sufficient duration, frequency, and intensity for selectively stimulating muscle groups of the driver, thereby to appraise the driver of the existence and orientation of the external condition.

The pointer transducers can include a laterally spaced pair of back transducers in the seat, and a plurality of belt transducers spaced along a driver-restraining seat belt of the seat and including a left-front vibrator and a right-front vibrator, the condition input including front, rear, right, and left directional components, the step of translating the condition input including enabling the left-front vibrator when the front and left directional components are activated, enabling the right-front vibrator when the front and right directional components are activated, enabling at least one of the back transducers when the rear directional components are activated, and activating at least one of the belt transducers when the front directional component is activated. The step of translating the condition input can include enabling at least one of the belt transducers and one of the back transducers when the right or left directional components are activated with the front and rear directional components deactivated.

DRAWINGS

These and other features, aspects, and advantages of the present invention will become better understood with reference to the following description, appended claims, and accompanying drawings, where:

Figure 1:
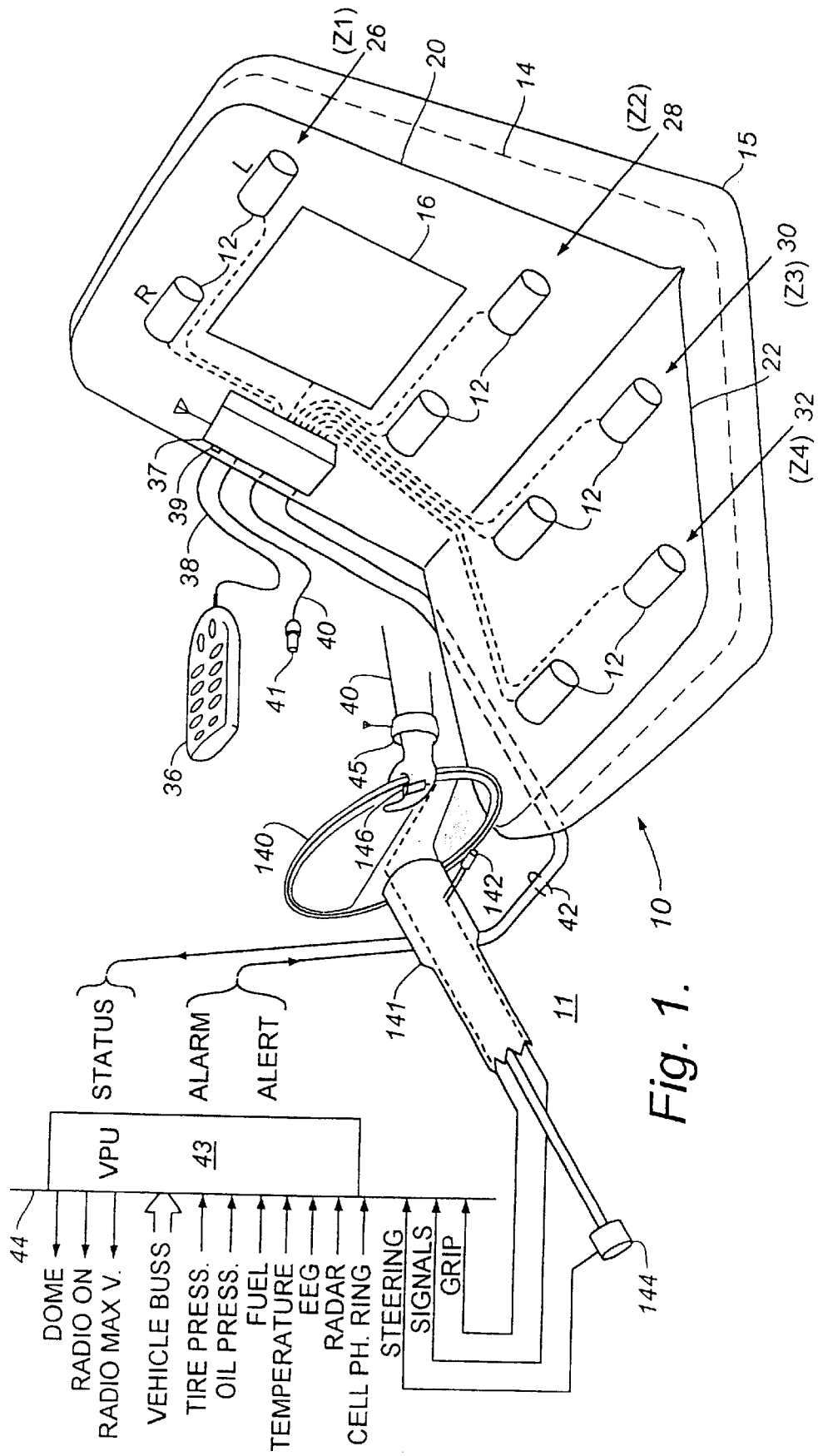
FIG. 1 is perspective diagrammatic view of a vehicle tactile alert system according to present invention.
Figure 9:
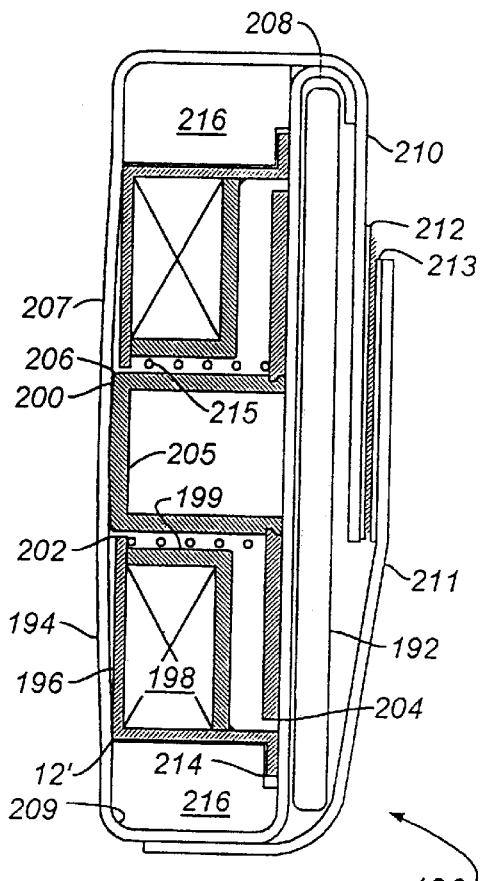
Figure 4A:
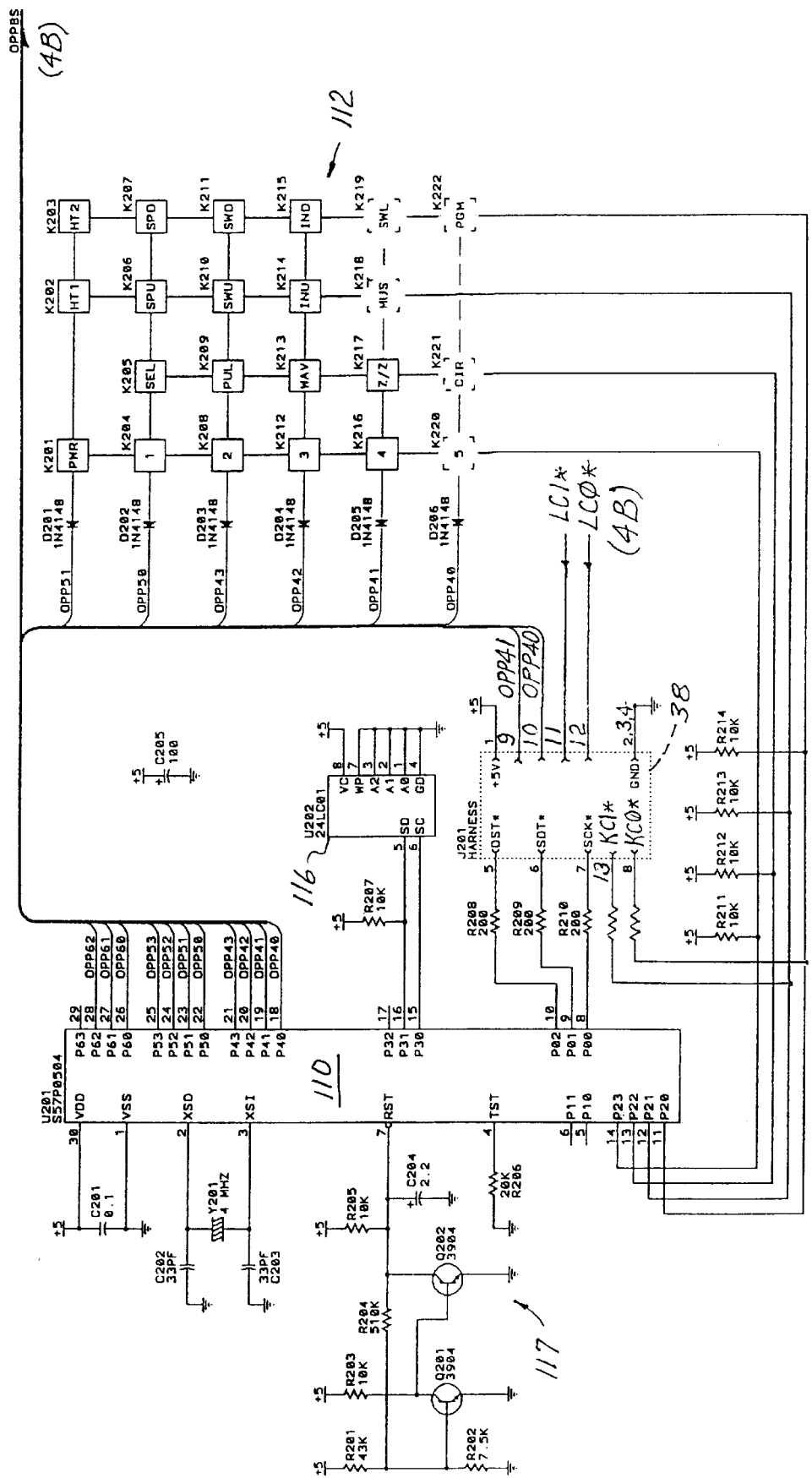
Figure 4B:
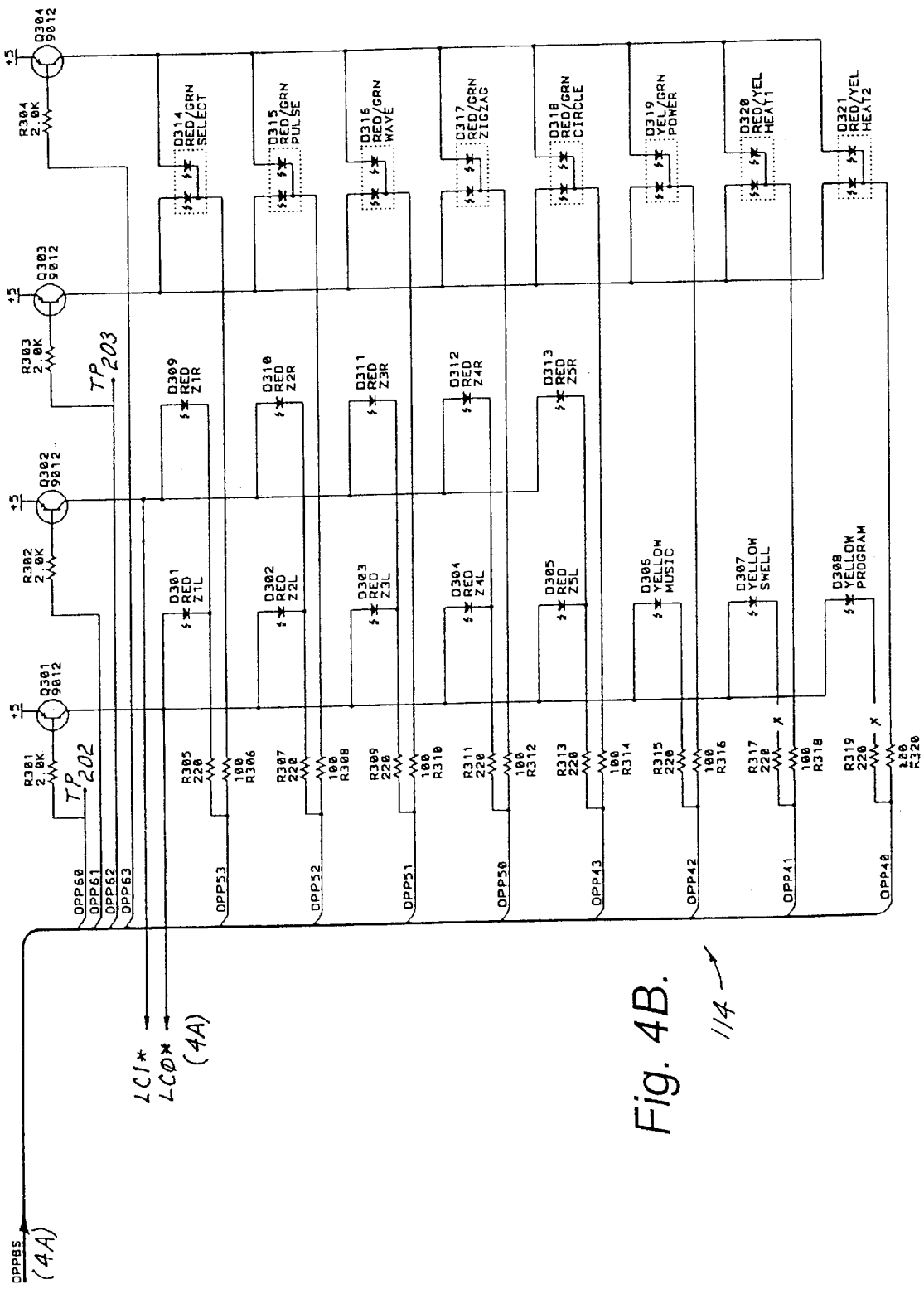
Figure 5A:
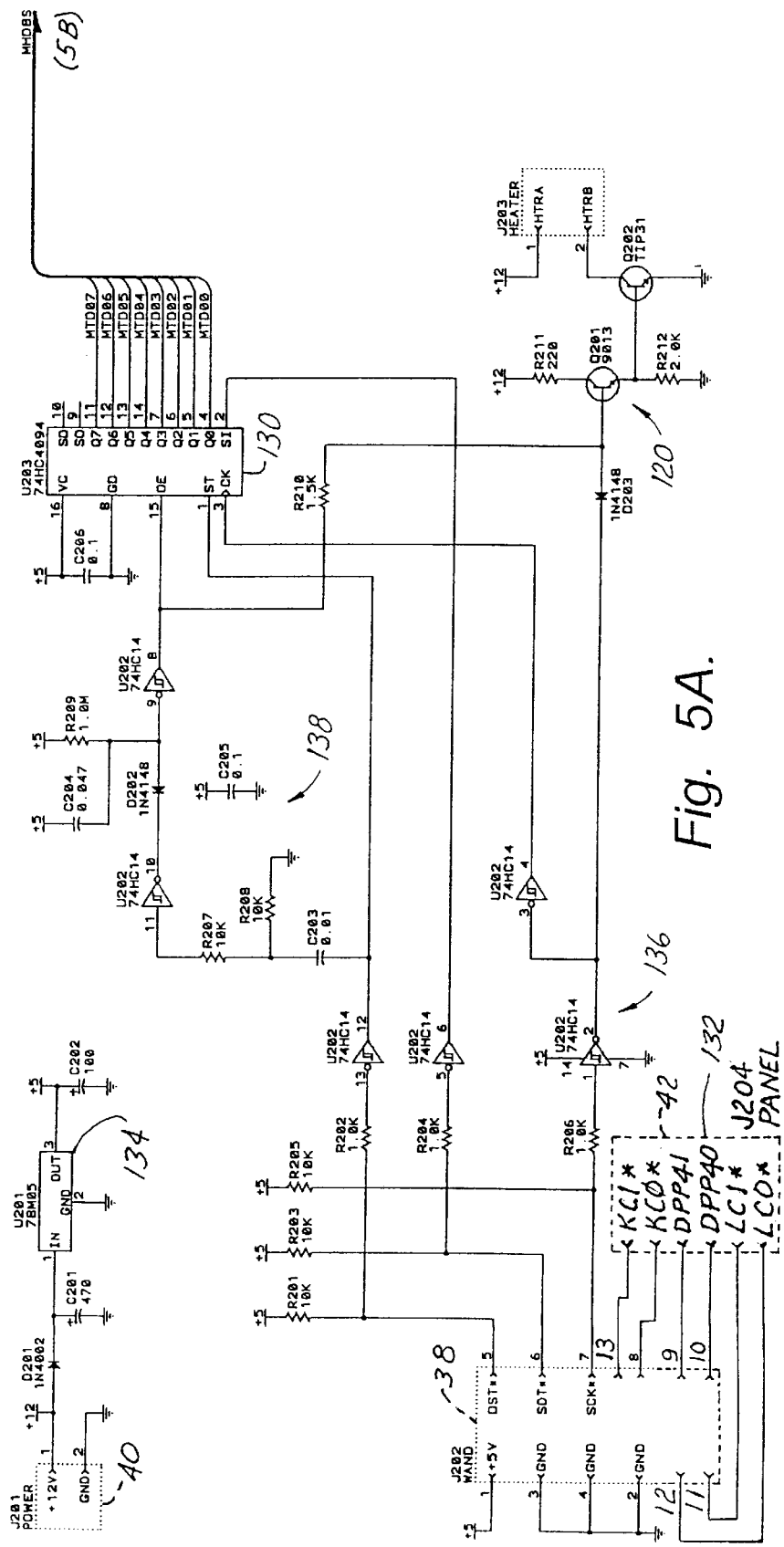
Figure 5B:
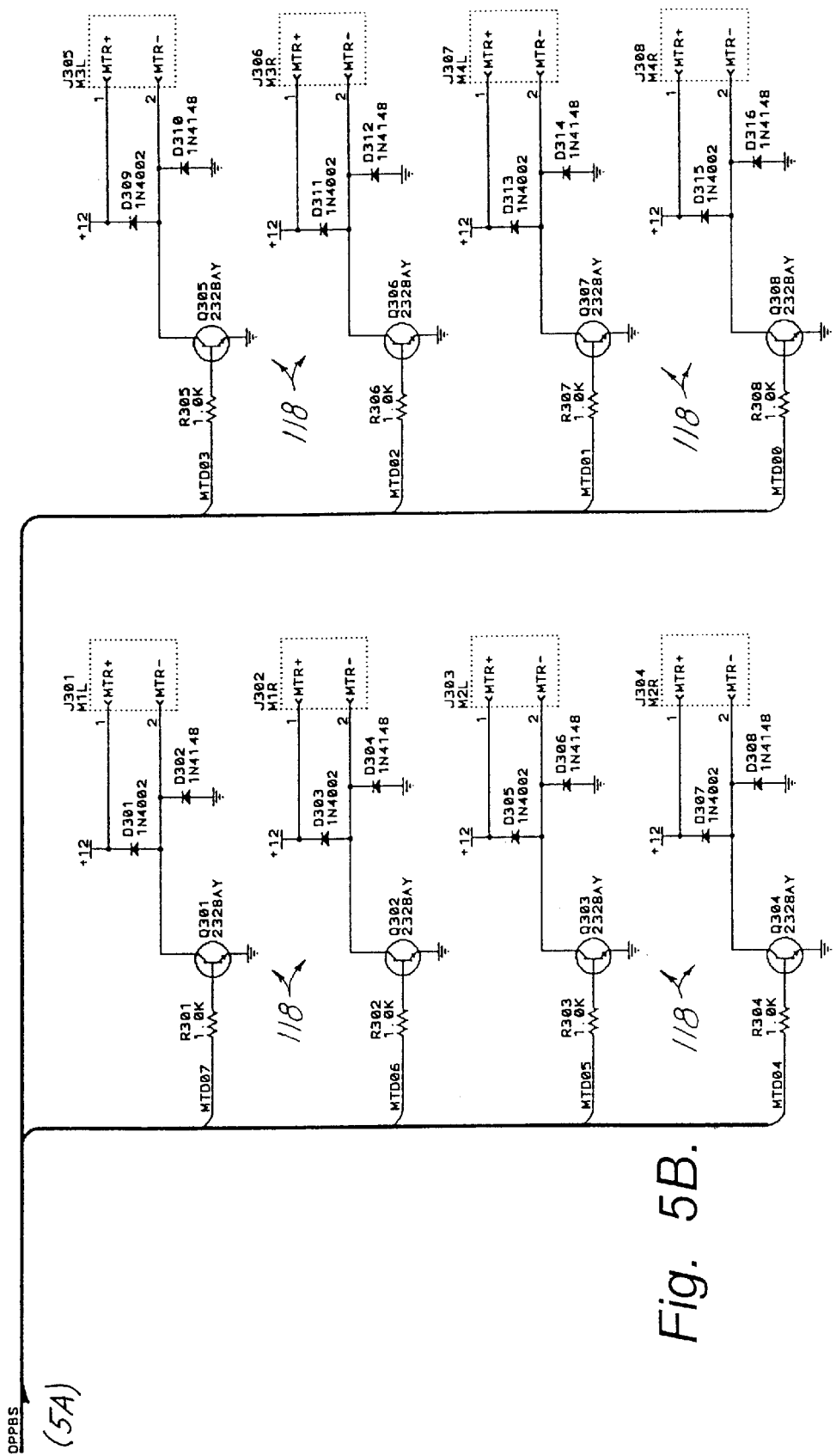
Figure 11:
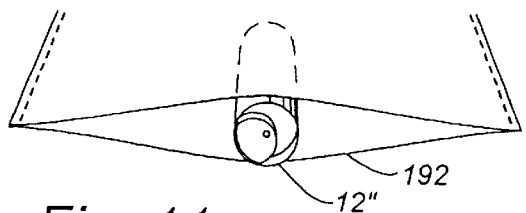
Figure 10:
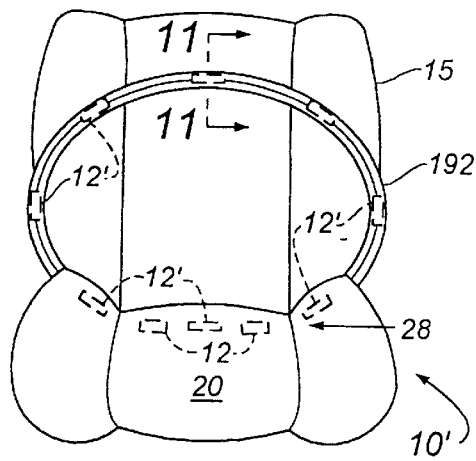
Figure 7:
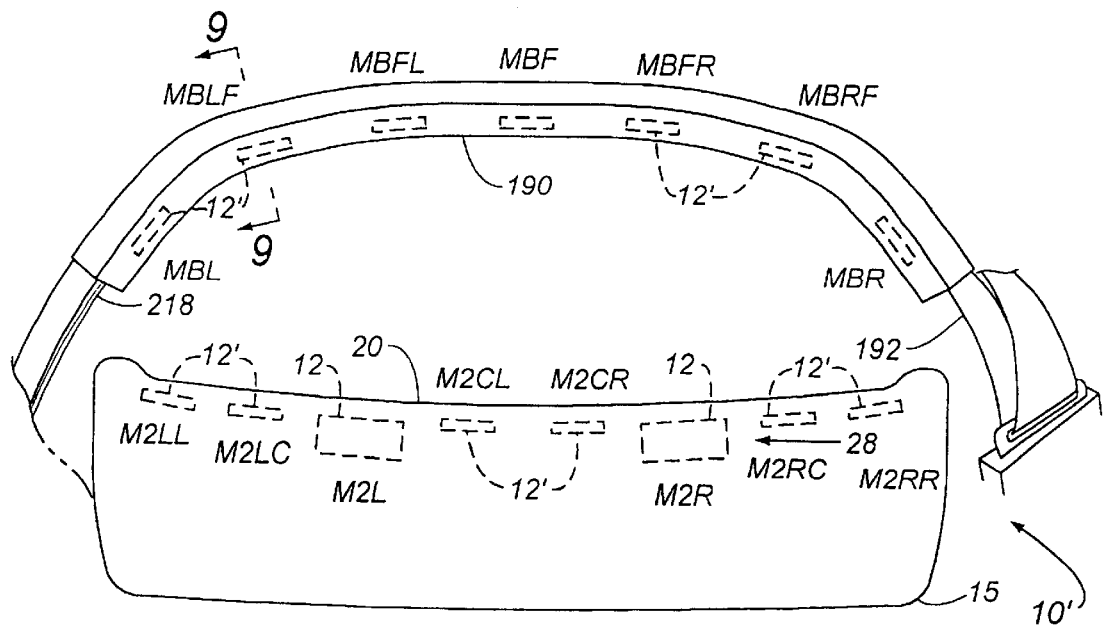
Figure 6:
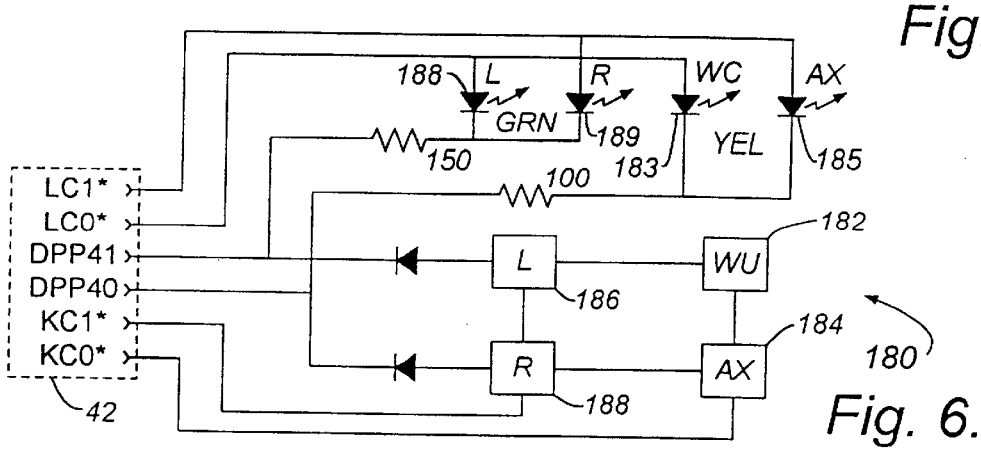
Figure 8:
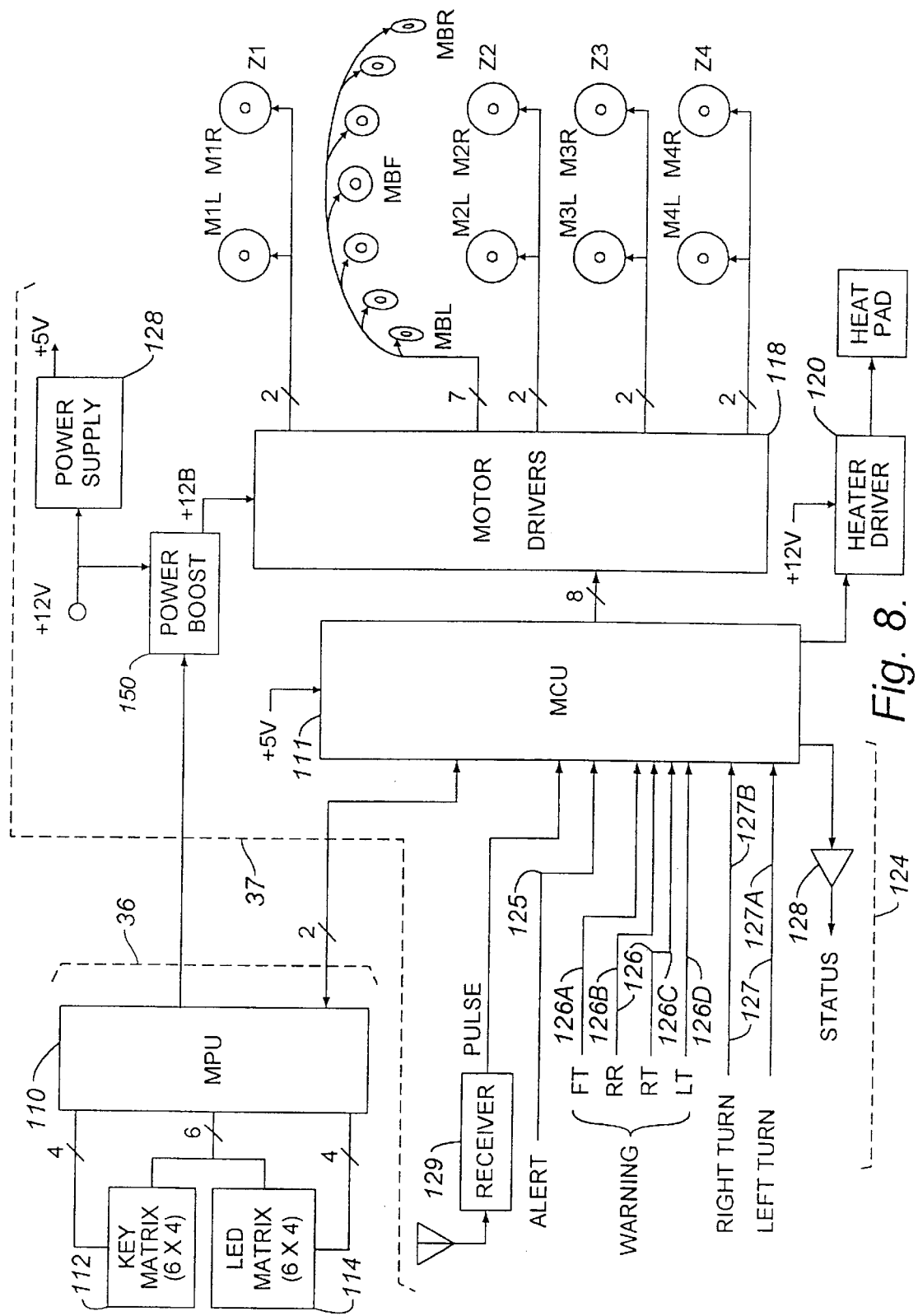
Figure 12A:
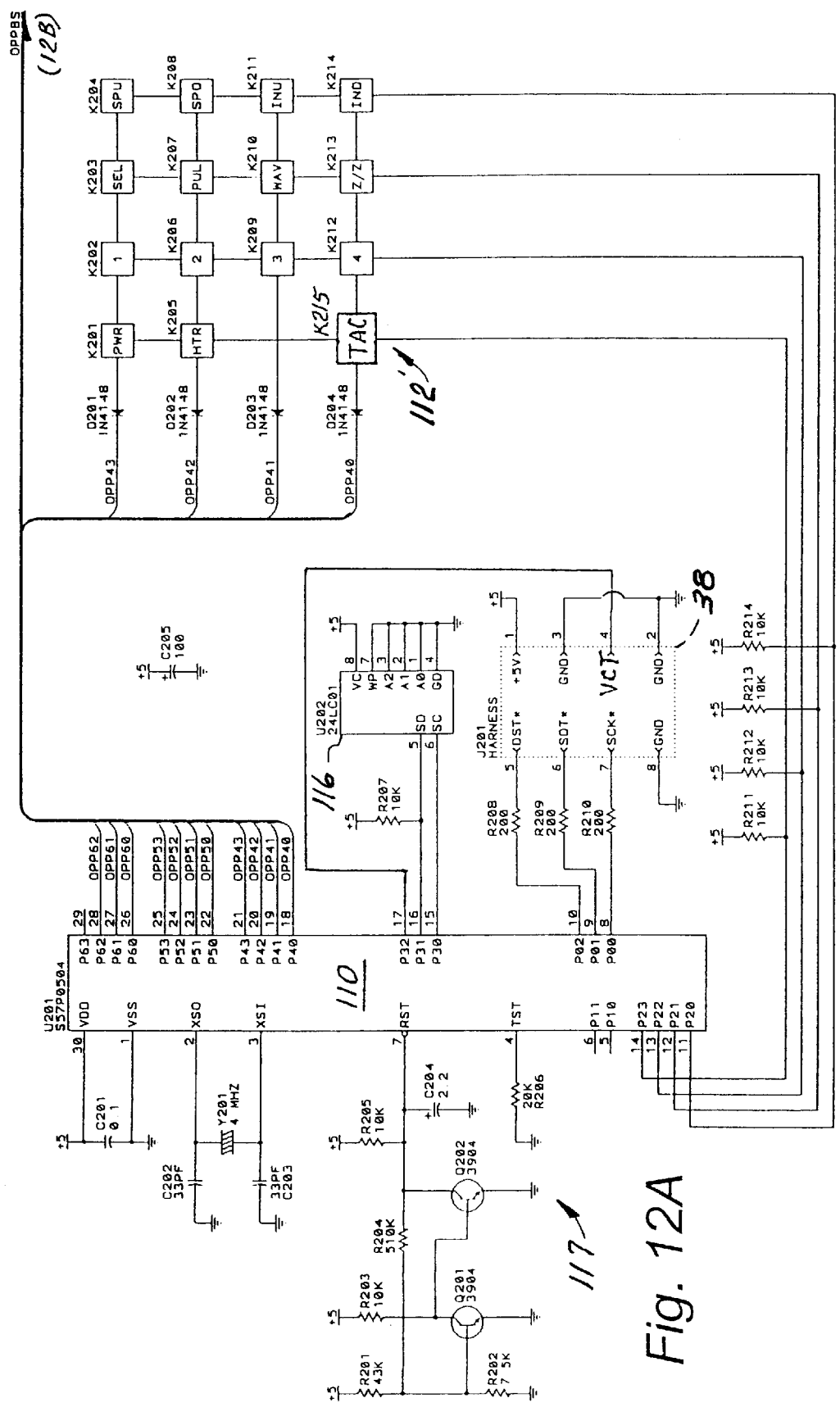
Figure 12B:
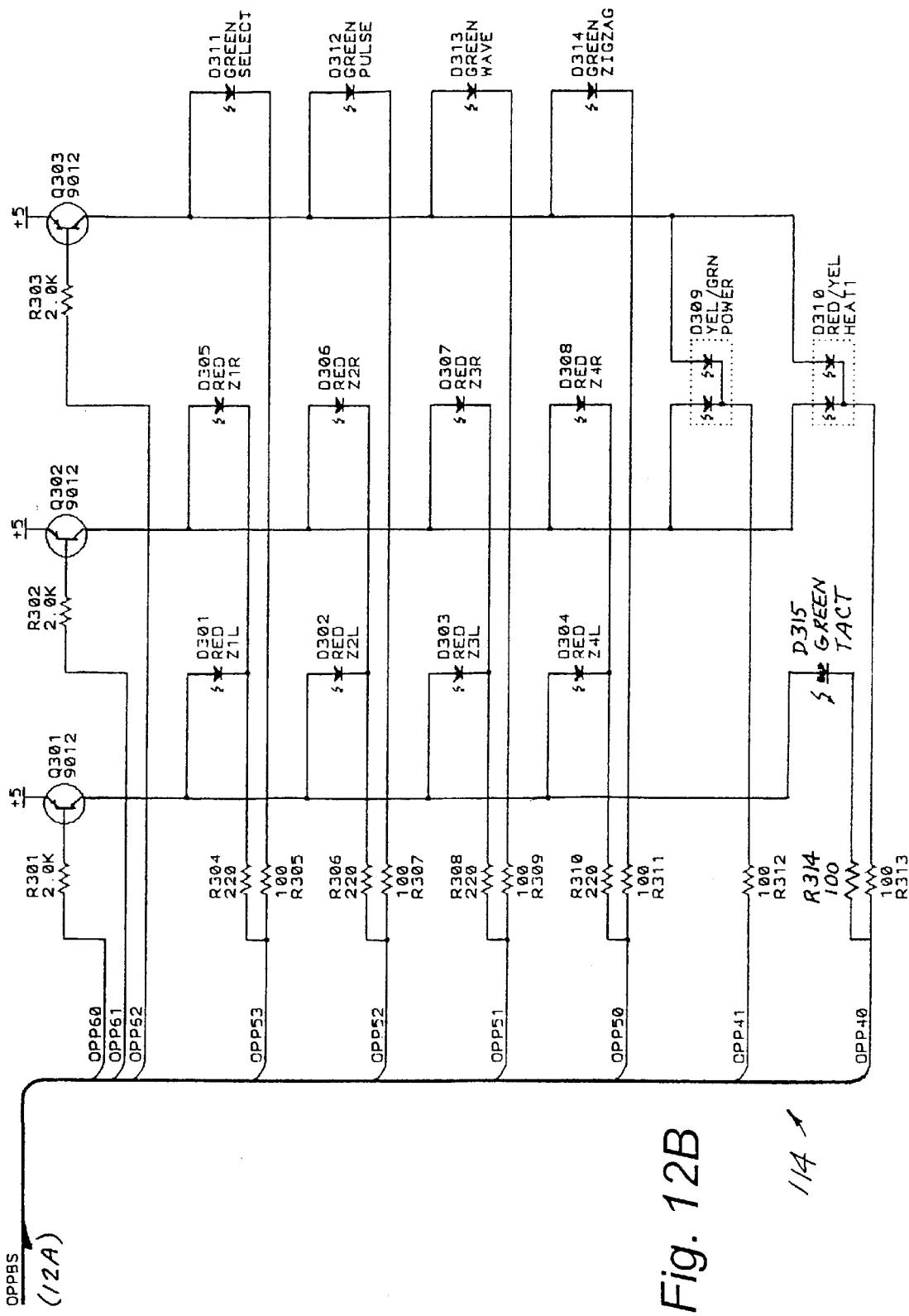
Figure 13A:
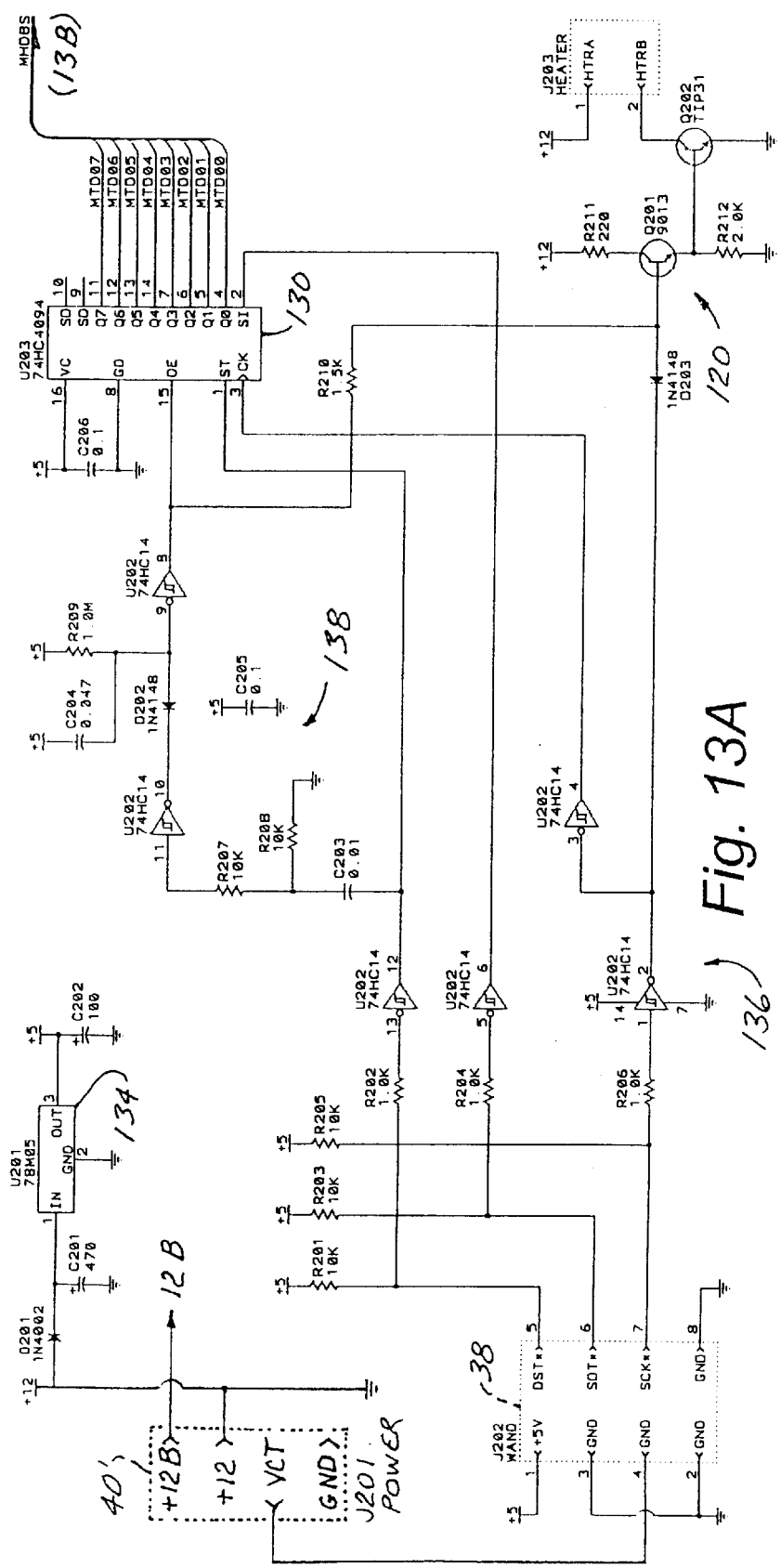
Figure 13C:
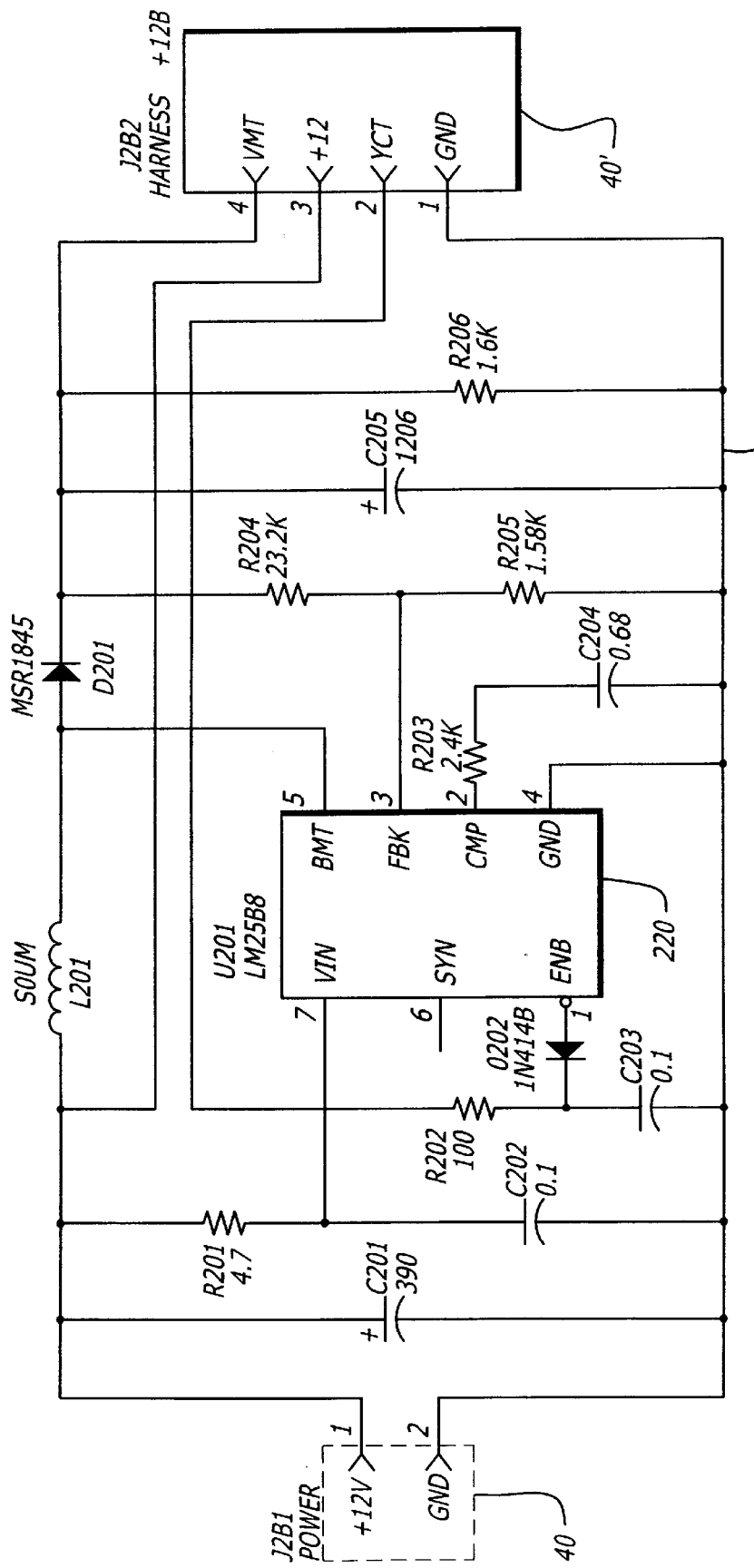
Figure 14:
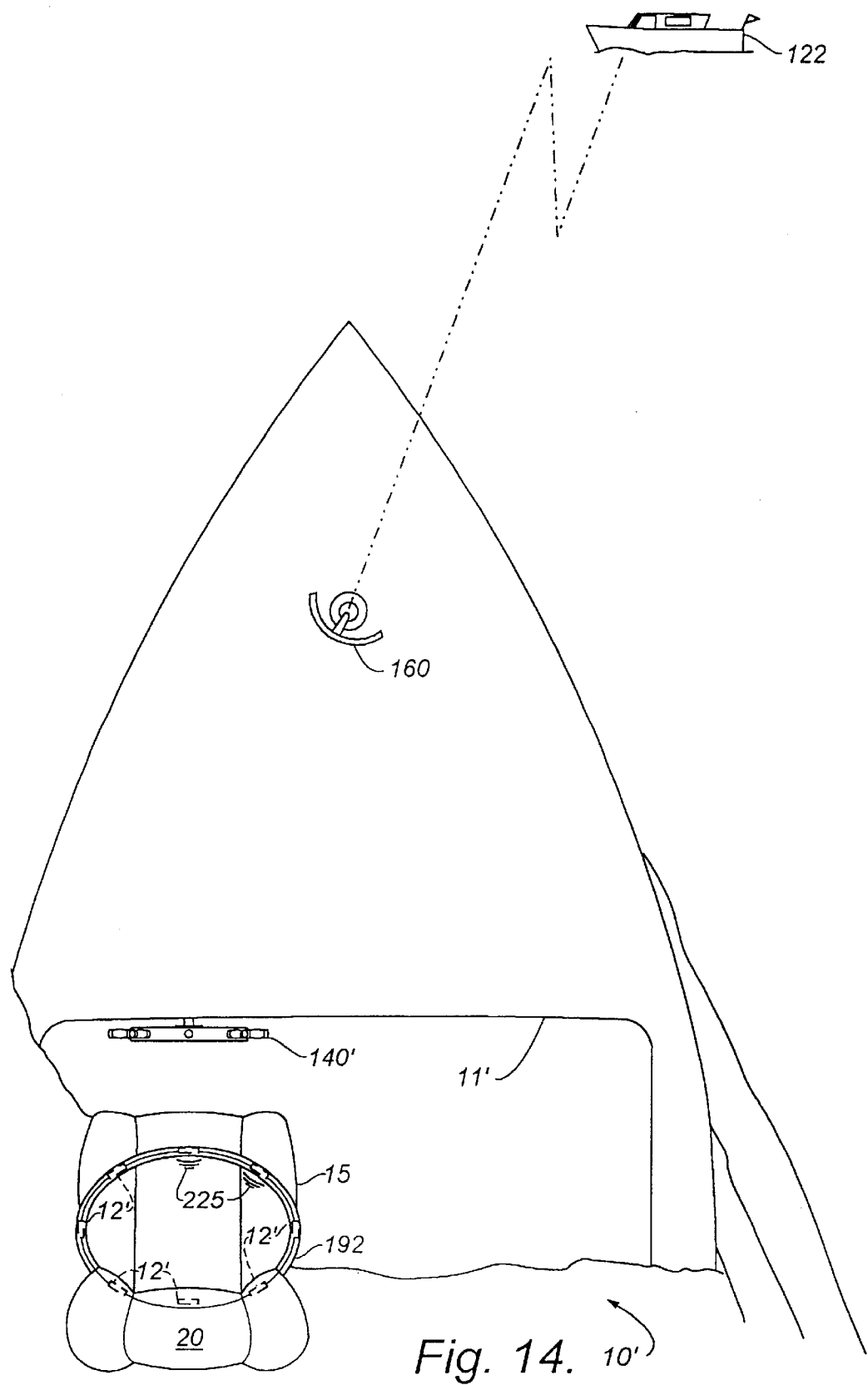

FIG. 4 (presented on separate sheets as FIGS. 4A and 4B) is a circuit diagram detailing the control wand portion in an experimental alternative configuration of the system of FIG. 1;

FIG. 5 (presented on separate sheets as FIGS. 5A and 5B) is a circuit diagram detailing an electronics module portion in the experimental alternative configuration of of the system of FIG. 1;

FIG. 6 is a circuit diagram of a dash panel module for the experimental configuration the wand and electronics modules of FIGS. 4 and 5;

FIG. 7 is a fragmentary plan view showing an alternative configuration of the system of FIG. 1;

FIG. 8 is a pictorial block diagram depicting control circuitry of the system of FIG. 1 in the alternative configuration of FIG. 7;

FIG. 9 is a sectional view on line 9—9 of FIG. 7;

FIG. 10 is a plan view showing an alternative configuration of the system of FIG. 7;

FIG. 11 is a fragmentary sectional perspective view on 11—11 of FIG. 10;

FIG. 12 (presented on separate sheets as FIGS. 12A and 12B) is a circuit diagram detailing the control wand portion in a second experimental configuration of the system of FIG. 1;

FIG. 13 (presented on separate sheets as FIGS. 13A, 13B, and 13C) is a circuit diagram detailing an electronics module portion in the second experimental configuration of of the system of FIG. 1; and FIG. 14 is a pictorial diagram showing the system of FIG. 7 in a marine environment.

DESCRIPTION

Figure 2:
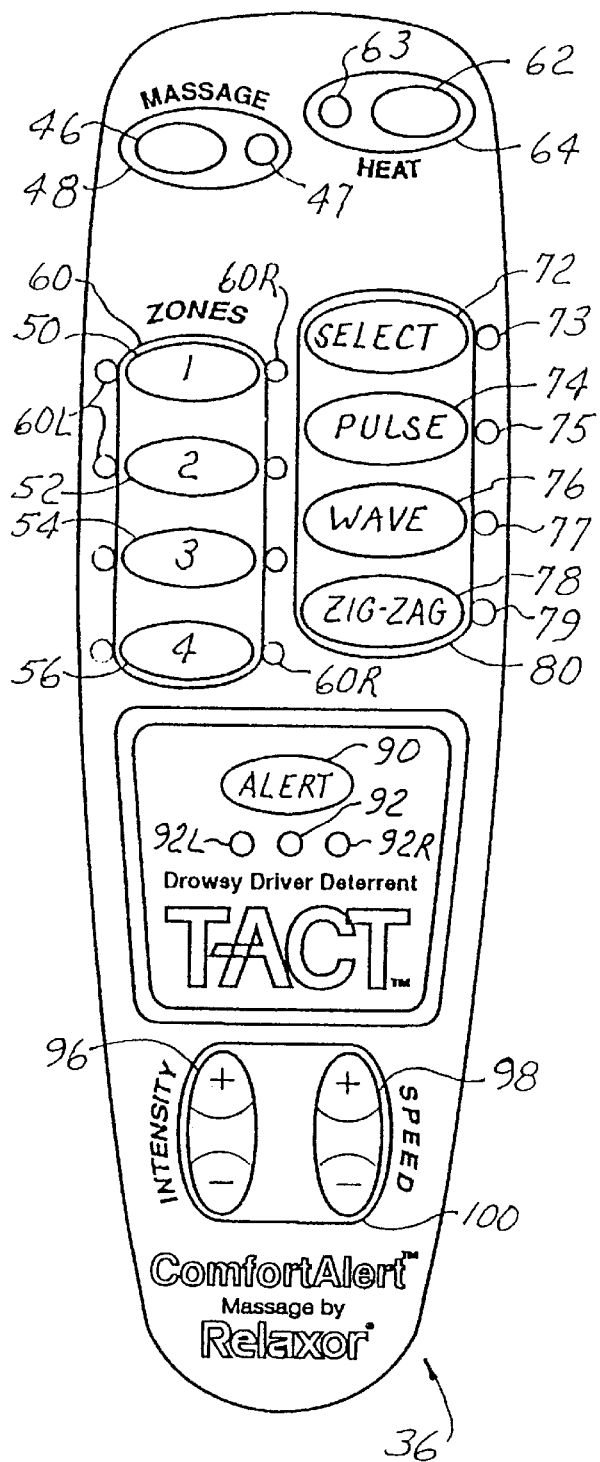
FIG. 2 is an enlarged view of a control wand portion of the system of FIG. 1.
Figure 3:
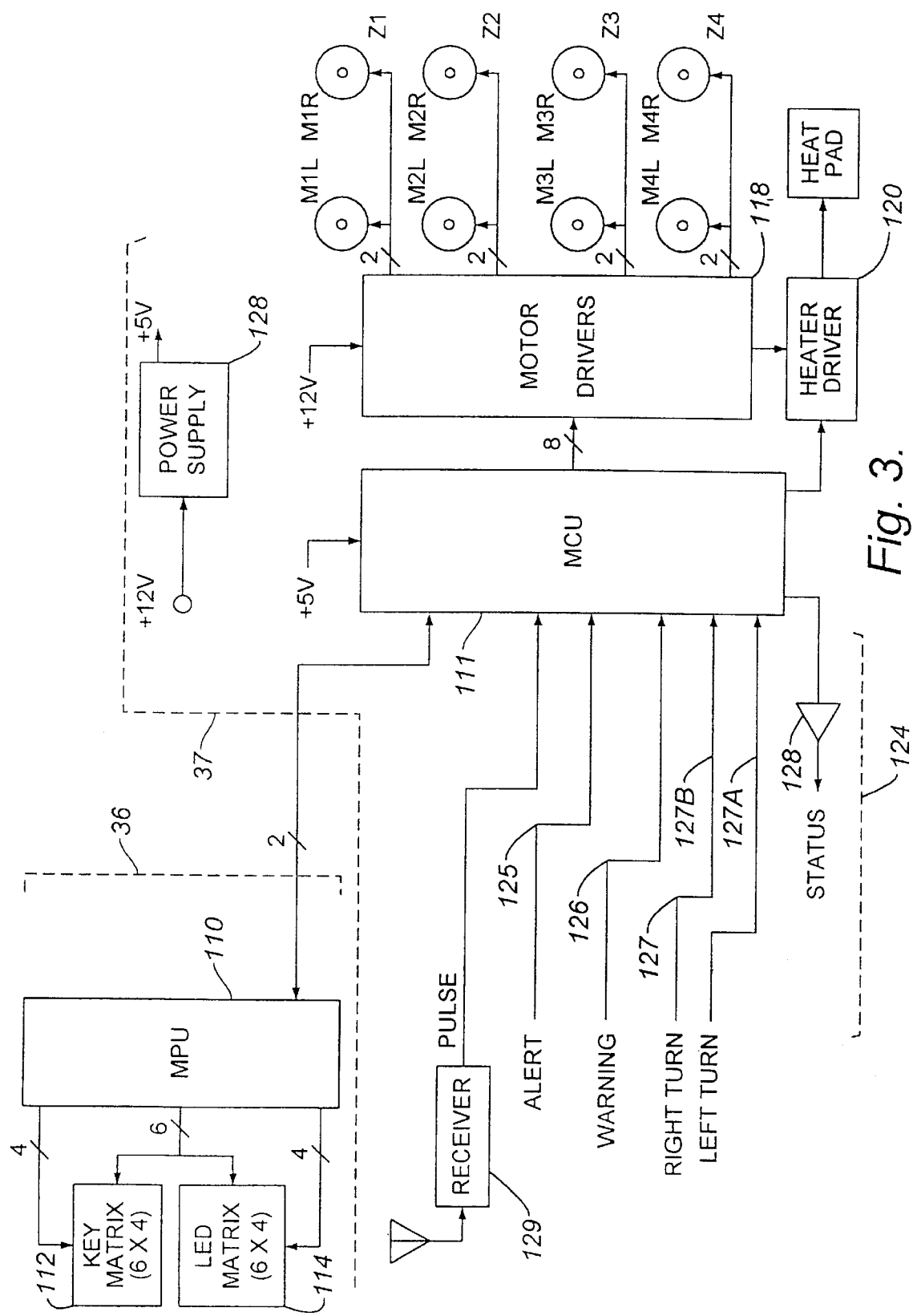
FIG. 3 is a simplified circuit diagram of the system of FIG. 1.

The present invention is directed to a tactile alert system that is particularly effective in enhancing and maintaining alertness of a user that can be the operator of equipment such as a vehicle. The system is also selectively effective for soothingly massaging muscle groups of the user, and silently warning the user of abnormal conditions in the equipment. With reference to FIGS. 1–3 of the drawings, the present invention comprises a microcontroller based tactile alert system 10 that is installed in equipment such as a vehicle 11. Although the arrangement of the vehicle 11 in FIG. 1 is typical of automobiles, it is to be understood that aircraft and watercraft as well as railroad vehicles are also contemplated as vehicles to be improved by the features of the present invention. Further, stationary equipment such as air traffic control systems and nuclear power plant monitoring systems can be advantageously provided with the system 10.

The system 10 has a plurality of vibrators 12 that are embedded in a seat pad 14 upon which a user sits. Each vibrator 12 is of conventional construction, and may comprise a small DC motor that rotates an eccentric weight, or if desired, a pair of eccentrics at opposite ends of the motor, the vibrators 12 being sometimes referred to herein as motors. Thus each vibrator 12 is caused to vibrate as the eccentric weight rotates, thereby deforming the pad and coupling the vibrations for stimulating and/or massaging muscle tissue of the user. The frequency and intensity of the vibrations, being proportional to the speed of the motor, are also nominally proportional to the voltage being applied to the motors. In an exemplary configuration of the vibrators 12, the frequency of vibration is between 60 Hz and 75 Hz when powered from a 12 volt DC source. It will be understood that other forms of vibrators may be used. The pad 14 can be supported on a seat 15 of the vehicle 11 or integrated therewith, and the pad 14 typically has a foam core and a covering of flexible fabric which can be a decorative material such as sheepskin fur. The pad 14 may also contain embedded heaters such as a heater 16 for enhanced stimulation and/or massaging. The pad 14 may be divided into foldable sections such as an upper or back section 20 (upper and lower back), and a lower or seat section 22 (hips and thighs). It will be understood that the pad 14 can also include a further section for stimulation and/or massaging of the user's calves, the user being depicted in FIG. 1 as a driver 25 of the vehicle 11.

In the exemplary configuration shown in FIG. 1, the pad 14 has eight vibrators 12 arranged in groups of two motors in four zones, as follows: (1) a first zone 26 for the left and right sides of the shoulder area; a second zone 28 for the left and right sides of the lower back; a third zone 30 for the left and right hips; and a fourth zone 32 for the left and right thighs. Particular ones of the zones and/or vibrators 12 are also sometimes referred to herein as Z1L, Z1R, Z2L, Z2R, Z3L, Z3R, Z4L, and Z4R as further indicated in the drawings. Typically, the heater 16 is centrally located in or between the shoulder and lower back areas 26 and 28. It will be understood that other groupings and numbers of zones are contemplated.

The system 10 is activated via a remote control device or wand 36 containing push buttons or keys and visual status indicators, as more fully described below. It will be understood that the wand 36 can have a fixed mounting as a control unit at a dash or console location of the vehicle 11; alternatively, the components of the wand 36 can be mounted in an integrated manner with other controls of the vehicle 11. In the exemplary configuration shown in the drawings, the wand 36 is removably coupled to an electronics module 37 in the massage pad via a cable 38, such as by a plug and socket coupling 39. The electronics module 37 is electrically connected to the vibrators 12 and the heater 16 by a suitable wiring harness as indicated by dashed lines in FIG. 1. The wand 36 and the massage pad 14 are powered through a power cable 40 having a power plug 41, from a suitable source such as DC power of the vehicle 11. It will be understood that suitable batteries for operating the system 10 can be located within the pad 14. The control wand 36 provides a variety of functions or modes which are performed through the manipulation of buttons, keys or equivalent means, with corresponding indicators that designate selected functions and modes. The system 10 is operable in response to signals that are communicated by an interface cable 42 from an electrical system of the vehicle 11 as further described below, the electrical system typically including a vehicle microprocessor 43 that is interfaced to an electrical vehicle buss 44. Optionally, the system 10 further includes a sensor unit 45 for wearing by the driver 13, the sensor unit 45 including a radio transmitter for communicating bodily function data such as blood pulse and/or EEG signals to the electronics module 37. For example, the sensor unit 45 can be in the form of a wrist band for carrying and holding a pressure transducer proximate an artery of the driver 13 as shown in FIG. 1.

In some modes of operation, several of the buttons act as double or triple action keys, as further described herein. Specifically, as depicted in FIG. 2, power is turned on or off by a "PWR" button 46 and, when power is supplied, an associated light-emitting diode (LED) 47 is illuminated, the button 46 and the LED 47 being located within an area 48 designated "MASSAGE". The PWR or power button 46 also acts as a double action key for selecting massage duration, and for entering test and demonstration modes that are described below. The four zones 26–32 are individually actuable by pressing corresponding buttons 50, 52, 54, and 56 within a "ZONES" area 60. Visual status indications are provided by respective lights 60L and 60R being disposed adjacent respective buttons or keys 50, 52, 54, and 56 for indicating activation of corresponding left and right ones of the vibrators 12. The heater 16 is operable at two levels by a heat button 62 with corresponding status indications by illumination of an associated LED 63, the button 62 and the LED 63 being within a "HEAT" area 64. The button 62 is a dual action key, sequentially selecting high and low heat levels for the heater 16 as described below.

SELECT, WAVE, PULSE and ZIG-ZAG massaging modes of operation are provided by pressing respective buttons 72, 74, 76, and 78, all enclosed within a modes area 80, SELECT being synonymous with manual operation. The buttons 72, 74, 76 and 78 have respective LEDs 73, 75, 77, and 79 associated therewith for indicating activation if the corresponding modes. "INTENSITY" and "SPEED" adjustments of the massaging modes are provided by the pressing of respective pairs of "+"/"−" switch buttons 96 and 98 within a common area 100. The INTENSITY adjustment relates to the power levels at which the vibratory transducers 12 are driven and, in the case of eccentrically loaded motors also to the frequency of the vibrations. The SPEED adjustment applies to the WAVE, PULSE and ZIG-ZAG modes, and relates to the rate of advancement between mode segments, described below.

According to the present invention, an ALERT stimulative operational mode is provided by pressing an ALERT button 90 and otherwise as described below for enhancing and maintaining a state of alertness of the user by means of a predetermined pattern of vibrations at relatively high intensity. The button 90 has LEDs 92 associated therewith, which may include, for example, a left LED 92L, a center LED 92C, and a right LED 92R. Additionally, an ALARM mode and/or a SIGNAL mode can be implemented in response to signals received on the interface cable 42. The LEDs 60L and 60R are red; the LEDs 73, 75, 77, and 79, are red/green; the LED 47 is yellow/green; and the LED 63 is red/yellow. The operations or effects of the various buttons of the wand 36 are described below.

Function Keys

The system 10 is preferably configured for selective implementation of a master set of features and modes of operation, an illustrative and preferred master set being set forth herein. Additional features and modes are described in commonly owned copending application Ser. No. 09/071,357, entitled Microcontroller Based Massage System, that was filed on Apr. 28, 1998, being incorporated herein by this reference. The function keys are in three major groups, namely selector, control, and mode. The selector keys include the power button 46, the heater button 62, and the four zone buttons 50–56. More specifically, the selector keys are used to turn on and off the massage and heater functions and select which massage zones are active.

The control keys include the up/down intensity buttons 90 (labeled "+" and "–"), and the up/down speed buttons 98 (labeled "+" and "–"). These keys are used to control the massage intensity and the operating mode speeds.

The mode keys include the SELECT or manual button 72, the wave button 74, the pulse button 76, and the zig-zag button 78. The mode keys are used to select the current massage operating mode as described further below.

Selector Keys

Regarding the specific selector keys, the power button 46 is a triple action key that cycles massage power through the states of "off", "on for 15 minutes" and "on for 30 minutes". The LED 47 is preferably bi-color for facilitating indication of the current massage power state. When an "on" state is selected, the massage system 10 will automatically turn off after operating for the selected time period. The first operation of the power button 46 after power is connected results in activation of the select mode described below with zone 1 enabled. In subsequent restartings of the system 10 by the power button 46, the system 10 comes on configured as in the most recent usage.

The heater and massage power keys operate independently of each other. The heat button 62 acts as a triple action key for cycling the heater 16 through the states of "off", "on low" and "on high". The LED 63 indicates the "on low" state by yellow, and the "on high" state by red. When an "on" state is selected, the heater 16 will automatically turn off after 30 minutes. The high state is at full power except as limited by a thermostat that is incorporated in the heater. In the low state, full power is applied for a warmup period of approximately 5 minutes, followed by continued operation at reduced power.

The four buttons 50–56 act as dual action keys for enabling and disabling operation of the left and right vibrators 12 in the respective massage zones 26–32. Visual indicators associated with each key are activated when the corresponding zone is enabled. The massage action produced by the enabled motors is determined by the currently selected operating mode.

Control Keys

Regarding the control keys, the intensity buttons 96 are a pair of individually operated or toggled keys that increase and decrease, respectively, the intensity of the massage. Briefly pressing and releasing either key will change the intensity setting to the next step. Pressing and holding either key will continuously change the setting until the key is released or the upper or lower limit is reached. Since the intensity of the massage provides feedback to the user, there are no visual indicators associated with these keys.

The speed buttons 98 are a pair of individually operated or toggled keys increase and decrease, respectively, the speed at which certain of the operating modes change the massage action. Briefly pressing and releasing either key will change the speed setting to the next step. Pressing and holding either key will continuously change the setting until the key is released or the upper or lower limit is reached. Since the speed at which the massage action changes provides feedback to the user, there are no visual indicators associated with these keys.

Operation Modes

As indicated above, operation is effected in several modes, including manual, wave, pulse, and zig-zag massaging modes, with further alert, alarm, and signal modes that exercise predetermined aspects of the other modes. In the manual mode, effected by pressing the SELECT button 72, the vibrators 12 in enabled massage zones 26–32 run continuously. Pressing manual button 72 terminates any previous massaging mode. The user may enable and disable the zones using the zone buttons 50–56, and customize the massage action by adjusting the intensity buttons 96. The select LED 73 is activated green. The zone selection is retained during operation of other modes as further described below. This select mode is operative in all implementations of the system 10.

In the wave mode (WAVE button 74), the enabled massage zones 26–32 are cycled sequentially, and the user may enable and disable zones, adjust the massage intensity and adjust the cycling speed. When the wave mode button 74 is operated, the associated visual indicator 75 is activated, and the speed buttons 98 (which are contemplated to be active in all implementations of the system 10) are operative, in addition to the zone buttons 50–56 and the intensity buttons 96, for customizing the massage action. Pressing the wave button 72 also terminates any previous massaging mode. Operation is by sequenced activation of selected zones downwardly from the first zone (26) to the fifth zone (34) and upwardly from the fifth zone (34) to the first zone (26), and repeating. The wave LED 75 is activated green.

In the pulse mode (PULSE button 76), enabled massage zones are simultaneously pulsed on and off. The zone, intensity, and speed keys (buttons 50–56, 96, and 98) may be used to customize the massage action. Pressing the pulse key 76 terminates any previous massaging mode. Operation is by cycling the vibrators 12 in enabled zones on and off at a duty cycle of approximately 50 percent, and at a rate corresponding to the current SPEED setting as defined by operation of the speed toggle buttons 98. The pulse LED 77 is activated green.

In the zig-zag mode (ZIG-ZAG button 80), a "shoelace" pattern sequence of activation of the vibrators 12 to the extent that indicated zones are enabled as described above. More particularly, diagonal pairs of the vibrators 12 are sequentially activated in a repeating pattern such as Z1L and Z2R, Z2R and Z3L, Z3L and Z4R, Z4R and Z5L, followed by Z1R and Z2L, Z2L and Z3R, Z3R and Z4L, Z4L and Z5R. The zig-zag LED 81 is activated green. Alternatively, the zig-zag mode can produce an alternating zig-zag pattern of Z1L, Z2R, Z3L, Z4R and Z5L, followed by Z1R, Z2L, Z3R, Z4L and Z5R, or an alternating pattern in each zone that repeats several (such as four) times in that zone, then moves to next zone.

The user may adjust the massage intensity and the cycling speed, and may also select audio intensity control for each of the above modes.

The alert mode (ALERT button 90) provides a predetermined sequence of alert stimulation cycles at relatively high vibrational intensity. Preferably, and as further described below in connection with FIGS. 8 and 13, the vibrators 12 are powered using an augmented boost voltage for providing in the alert mode vibrational intensities greater than in the massaging modes. In an exemplary configuration of the system 10, the alert LED 90C is activated yellow, and operation is preferably as follows:

(a) A first alert cycle having an active portion corresponding to the pulse massaging mode, with all zones active at maximum intensity and maximum speed for a duration of approximately 15 seconds, followed by an inactive portion wherein all motors are off, the pulse LED 75 being activated red. In the preferred configuration providing the augmented boost voltage driving the vibrators, an intensity level signaled within the electronics module 37 is translated to an augmented intensity as described below.

(b) A second alert cycle corresponding to the first alert cycle, but wherein the activation alternates between the left and right ones of the vibrators 12, the pulse LED 75 being activated orange.

(c) A third alert cycle having an active portion corresponding to the zig-zag massaging mode, with all zones active at maximum intensity and maximum speed for a duration sufficient for cycling all zones down and up, approximately 15 seconds, followed by an inactive portion wherein all motors are off, the zig-zag LED 79 being activated red.

(d) A fourth alert cycle having an active portion corresponding to the wave massaging mode, with all zones active at maximum intensity and maximum speed for a duration sufficient for cycling all zones down and up, approximately 15 seconds, followed by an inactive portion wherein all motors are off, the zig-zag LED 79 being activated red.

(e) A fifth alert cycle corresponding to the first alert cycle, but having activation of randomly selected vibrators 12, the pulse LED 75 being activated green.

Another and preferred implementation of the alert mode is as described above, except as follows:

(a) The active portion of the first alert cycle proceeds as described above for a first sub-interval of approximately 4 seconds, then in random groups of two vibrators 12 being activated at the same time for a second subinterval of approximately 7 seconds, followed by a third subinterval corresponding to the first subinterval;

(b) The active portion of the second alert cycle is as described above, except that random pairs of the vibrators 12 are activated in the respective left and right sub-intervals of the cycle;

(c) The active portion of a third alert cycle is as described above, except that the progression among zones is random; and (d) The active portion of the fourth alert cycle has three sub-intervals as described above for the second alert cycle, random ones of the zones being activated in the second sub-interval.

Following the first alert cycle, the other alert cycles can be activated in any order, the alert cycles continuing until the alert mode is terminated as described below. Preferably, successive alert cycles differ in at least one of intensity, frequency, active portion duration, idle portion duration, and transducers enabled. In the alert mode, the zone buttons 50–56, the mode buttons 72, 74, 76, and 78, and the intensity and speed buttons 96 and 98 are inoperative. A further (second) pressing of the alert button 90 causes termination of the alert mode, and restoration of any massaging mode that was active at the onset of the alert mode.

In addition to activation by the ALERT button 90, the system 10 provides for activation by external signals such as a drowsiness detection signal and radar warning signals that can be transmitted by the interface cable 42 from the vehicle microprocessor 43. Alternatively or in addition, a blood pulse signal or other biometric signals can be received as wireless transmissions for activating the alert mode.

The alarm mode provides stimulation of the user that is effective for calling attention to an abnormal condition of the vehicle 10, such as conditions of overheating, low fuel supply, low tire pressure, or potentially dangerous environmental conditions such as the sounding of a siren, railroad crossing alarm, etc., or an incoming radar signal such as might signal a collision course of the vehicle 11. As in the alert mode, when the system includes the preferred implementation providing the voltage boost to the vibrators 12, preferably the augmented boost voltage is also activated in the alarm mode for providing in the alert mode vibrational intensities greater than in the massaging modes. In an exemplary implementation of the alarm mode of the system 10, at least one of the alert LEDs 90 is activated red, and operation is as follows:

(a) A first alarm cycle corresponding to the pulse massaging mode, with all zones active at maximum intensity and maximum speed for a duration of approximately 15 seconds; and (b) A second alarm cycle corresponding to the first alarm cycle, but wherein the activation alternates between the left and right ones of the vibrators 12. As in the alert mode, the intensity level signaled within the electronics module 37 is translated to an augmented intensity when the augmented boost voltage is activated.

Another and preferred implementation of the alarm mode repeats a single alarm cycle ,corresponding to the first alarm cycle, but having an active portion and an idle portion, and wherein each portion has a duration of approximately 5 seconds.

The signal mode provides vibratory stimulation that is coordinated with external signals such as operation of left and right turn signals of the vehicle 11. This mode, which can also modify the operation of the massaging and alert modes, is activated by corresponding signals received through the interface cable 42. For example, a left turn submode of the signal mode repetitively activates the left vibrators 12 only, at medium intensity; and a right turn submode of the signal submode repetitively activates the right vibrators 12 only, also at medium intensity.

The alarm and signal modes can be tested without reliance on external signals in a test mode that is entered following a power off condition using a special combination of function keys before operating the PWR key 46. Exemplary key combinations and test sequences are disclosed and described in the above-referenced copending patent application Ser. No. 09/071,357. Similarly, a demonstration (demo) mode provides a continuing sequence that can include all of the massaging, alert, alarm, and signal modes in a manner that is within the skill of the art of a designer also having knowledge of the referenced patent application.

System Architecture

Referring to FIG. 3, the control architecture of the massage system 10 is based on a microprocessor (MPU) 110, a key matrix 112, and a system status matrix 114 in the wand 36, and a microcontroller (MCU) 111 in the electronics module 37, the MCU 111 being serially interfaced with the MPU 110 through the cable 38. Each of the MPU 110 and the MCU 111 have appropriate crystal clock elements and power-on reset circuitry (not shown). Either or both of the MPU 110 and the MCU 111 can have a serial erasable, electrically programmable memory (EEPROM) associated therewith as described in the above-referenced copending patent application for facilitating programming and configuring same.

Wand

The wand 36 is serially interfaced to the pad 14 for permitting the cable 38 to have only a few conductors, six for example. A suitable device for use as the MPU 110 and/or the MCU 111 is a 4-bit KS57C0004 chip manufactured by Samsung Electronics. As shown in FIG. 3, the MCU 110 is operated at 5-volts being provided from the electronics unit 37, described below. The key matrix 112 has the various (15) buttons of the wand 36 electronically wired in a 6-by-4 matrix that is periodically scanned by the MCU chip 110. Keyboard scanning and LED display generation is performed in a multiplexed fashion that makes optimum use of the available processing time. The scanning algorithm uses leading edge detection with trailing edge filtering or debouncing. This provides rapid response to key pressings and eliminates multiple pressing detection due to slow contact closure or contact bounce. Without this feature, the alternate action selector keys might jitter on and/or off as each key was pressed or released. The scanning algorithm also looks for multiple key pressings and ignores any condition where two or more keys appear simultaneously pressed. This is required to eliminate "phantom key" detection caused by electrical shorting of the rows and columns of the matrix as certain combinations of keys are pressed. This key arrangement and scanning algorithm advantageously reduces the number of MCU input/output pins required to detect key pressings. Other key arrangements and scanning algorithms are also usable; however, the matrix approach is the most economical in terms of MCU resources. It will be understood that unused positions of the key matrix 112 are available for additional functions.

The system status matrix 114 contains the various LED power, heater and mode, zone and control indicators 47, 60L, 60R, 63, 73, 75, 77, 79, 90L, 90C, and 90R. As described above, some of the LED indicators are multiple color devices; they have three terminals in the exemplary configuration described herein, each being connected in the matrix 114 as two separate devices. The system status matrix 114 is configured as 4-by-6 and driven in a multiplexed fashion by MPU 110, each "column" of 4 LEDs being activated for about 24% of each display cycle. The period of the complete display cycle is short enough so that all activated indicators appear fully illuminated without any noticeable flicker. Flashing of selected indicators is a function performed by the control firmware independent of the display cycle.

The status indicator matrix 114 in combination with associated programming of the MPU advantageously reduces the number of MPU output pins required to illuminate the indicators. To further conserve MCU resources, the ten drive signals of the system status matrix are shared with the key matrix 112. During the 2% of the display cycle when the display is inactive, six of the signals are used to scan the rows of the key matrix. Other visual indicator arrangements and driving algorithms are also possible; however, the matrix approach is the most economical in terms of MPU resources. It will be understood that unused positions of the indicator matrix are available for additional functions.

Electronics Module

As further shown in FIG. 3, the electronics module 37 of the pad 14 includes motor drivers 118 for activating corresponding ones of the vibrators 12 (FIG. 5A), and a heater driver 120 for powering the heater 16 (FIG. 5B), the drivers being responsive to the MCU 111. The operating voltage of the drivers 118 and 120 is nominally 12–14 V DC. The module 37 also includes a 5-volt power regulator 134 (FIG. 5B) for powering the MCU 110 of the wand 36 and the MCU 111 and logic circuitry of the electronics module 37.

Stimulation and massaging intensity (motor speed) is controlled by pulse width modulation (PWM) of the signals applied to the drivers 118. This, in turn, controls the average power applied to each motor. While a duty cycle range of 0–100% is possible, other factors limit the range to about 16–98%. These factors include motor stalling at low speeds, and subjective evaluation of minimum and maximum intensity levels. To reduce the audible noise generated by the PWM process, the pulse rate modulation frequency is set to between approximately 50 Hz and approximately 60 Hz, 55.56 Hz, for example.

The heater driver 120 is configured as a buffered saturated transistor switching circuit. Heat level is controlled by pulse width modulation of the signal applied to the driver in the 'same manner as for the motor drivers. For high heat, the duty cycle is set to 100%. For low heat, the duty cycle is set to 100% for a warm up interval and then is reduced to 50%. The warm up interval ranges from 0 to 5 minutes depending on the amount of time the heater was previously off. The heating pad 16 contains an integral thermostat that limits the maximum operating temperature. Motor and heater control is performed using pulse width modulation (PWM), a communication occurring each time the on/off state of any driver is to change. This is normally a minimum of two communications per pulse width modulation (PWM) cycle or about 110 per second. The drivers 118 and 120 can include appropriate gating for suppressing activations in case of inactivity of the MCU 111, as described in the above-referenced copending patent application.

PWM Cycle Pairs

All processing is performed synchronously with PWM cycles which have a period of 18,000 μs and a frequency of 55.56 Hz. To reduce processing overhead, keyboard scanning, display driving and ADC data reading is performed over two consecutive PWM cycles. The processing interval for these PWM cycle pairs has a period of 36,000 μs and a frequency of 27.78 Hz. Each PWM cycle is divided into 100 time segments of 180 μs each. All motor and heater state changes occur on a segment boundary. Thus the minimum motor intensity or heater power change is 1% of the maximum value. The time segments are numbered 99 through 0 starting at the beginning of the cycle. The sequence of events over the PWM cycles and pairs thereof can be as described in the above-referenced patent application, except that the MCU 111 is not required to process the scanning of the key and system status matrices 112 and 114. It will be understood that these functions can be combined in a single MCU as disclosed in the above-referenced patent application and that approach was in fact utilized in an experimental prototype of the system 10, described below.

Vehicle Interface

As further shown in FIG. 3, the electronics unit 37 has a vehicle interface 124 for communications between the MCU 111 and the vehicle buss 44 over the interface cable 42. In an exemplary implementation, an ALERT input 125, a warning input 126, and signal inputs 127 including respective LEFT and RIGHT TURN signals 127A and 127B feed separate port lines of the MCU 111, and the MCU 111 feeds a STATUS; output signal over the interface cable 42 through a line driver 128. It will be understood that the STATUS output signal can contain multiple bits of information on corresponding lines as an alternative to the single channel shown in FIG. 3. The STATUS output signal can provide, following activation of the alert mode either manually or in response to a drowsiness detection device, that after a predetermined period in which the driver does not respond and deactivate the alert mode, further remedial action is taken such as one or more of activating vehicle brake lights, activating warning flashing lights to notify nearby drivers of the abnormal condition, and/or restricting engine output such as by cutting fuel flow.

The alert input 125 can be responsive to a dashboard-mounted button or switch (a counterpart of the alert button 90) for manual user control, and/or it can be derived from an automatic determination of a drowsy condition of the driver by the VPU 43 as described below. The unit 37 optionally includes a radio receiver 129 for communicating bodily function signals from the sensor unit 45 to the MCU 111. It will be understood that the radio receiver 129 can instead be associated with the vehicle microprocessor 43, the signals being processed therein and combined with other data as described herein for producing the ALERT signal. The warning input 126 can be responsive to respective FUEL LOW, LOW TIRE, LOW OIL PRESS, OVERHEAT, and COLLISION conditions as signaled to or determined by the VPU 43. The vehicle 11 has appropriate sensors for communicating the above conditions to the VPU 43, such as a radar sensor for sensing an impending collision. Additional inputs to the vehicle buss 44 such as low oil, coolant and/or brake fluid quantity, and low air pressure are also contemplated within the scope of the present invention, the inputs being included in the generation of the warning input 126 by the VPU 43.

As further shown in FIG. 1, a SILENT CELL PHONE RING signal can be connected to the vehicle buss 44 from a cell phone device (not shown) that may be present in the vehicle 11. Also, the vehicle 11 typically includes a steering wheel 140 on a steering column 141, a turn signal lever 142 projecting from the column for conventionally signaling intended left and right turns. The signal lever 142 is electrically coupled to the vehicle buss 44 for generating the LEFT and RIGHT TURN signals 127A and 127B. The vehicle 11 can also have a steering transducer 144 for communicating movements of the steering wheel 140 to the VPU 43. The VPU 43 can be implemented by known methods for generating the alert input 125 based on differences in patterns of steering behavior of the driver 25 between alert and drowsy conditions. A further optional element is a grip transducer 146 that can be located on the steering wheel 140 in positions that would normally be contacted by the user's hands when the vehicle 11 is being driven, the transducer 146 signaling gripping pressure forces exerted against the steering wheel 140 by the driver 25.

Firmware

Architecture: The ROM firmware of the MPU 110 of the wand 36 is directed to signaling key pressings in the key matrix 112 to the MCU 111, and activating LEDs of the status matrix 114 in response to data received from the MCU 111. This wand firmware may include initialization modules as described in the above-referenced copending patent application, and the initialization data for the MCU 111 can also be temporarily stored in an EPROM of the wand 36. The ROM firmware of the MCU 111 is divided into a set of mainline and timer interrupt modules that are activated during operation of the tactile alert system 10, and may include initialization modules for loading an EPROM associated therewith as described above. The mainline modules have direct control of the stimulation, massage, and heat activations of the system, in response to key pressing signals from the wand 36, and to signals received by the vehicle interface 124, changing the activations as a function of the current operating mode. The timer interrupt modules perform all of the time dependent sense and control tasks requested by the mainline modules plus processing of power, heater, intensity and speed key pressings. The mainline and interrupt modules execute in an interlaced fashion with the latter preempting the former whenever a timer interrupt occurs. Communication between the two is via RAM flags and control words.

Mainline Modules: The names and functions of the mainline modules defined in Appendix A are as follows:

Power-On Initialization (POIN). Executes once following application of main power (battery or AC) to the device to initialize hardware registers, initialize RAM contents, test for an AC or DC power supply, detect activation of the set-up mode, and then start the timer interrupt module for sensing operator input, etc.

Massage Power Resets (MPRS). Initializes the unit into Select Mode with Zone 1 enabled. Executed following POIN and TSMD (described below).

Massage Power Idle (MPID). Executes when the massage power is off to sense key pressings or events that would activate another mode. These include the POWER (key 46), the ZONE 1–4 (keys 50–56), and can include key sequences that enable the POWER key to turn the unit on in test and/or demonstration modes.

Start Primary Operating Mode (STPM). Executes following MPID to branch to a primary mode section of the program.

Wake-up Mode (WUMD). Executes when the unit is in Alert Mode to generate the predetermined sequence of alert stimulation cycles as described above.

Auxiliary Mode (AXMD). Executes when the unit is in alarm mode to generate the predetermined alarm sequence as described above.

Select Mode (SLMD). Executes when the unit is in Select Mode to run the selected zone motors and sense key pressings. The ZONE 1–4 keys toggle the state of the zones and the WAVE, PULSE, ZIG-ZAG, and ALERT keys (keys 74, 76, 78, and 90, respectively) and/or the alert, warning, and signal inputs 125, 126, and 127, transfer execution to the appropriate module. If the radio receiver 129 is implemented, the select mode is also responsive to a flag that is conditionally set based on the time history of the receiver output for activating the alert mode.

Pulse Mode (PLMD). Executes when the unit is in Pulse Mode to pulse the selected zone motors and sense key pressings. The ZONE 1–5 keys toggle the state of the zones and the WAVE, ZIZ-ZAG, and ALERT keys (keys 74, 78, and 90, respectively) transfer execution to the appropriate module.

Wave Mode (WVMD). Executes when the unit is in Wave Mode to run the selected zone motors in wave fashion and sense key pressings. The ZONE 1–4 keys toggle the state of the zones and the SELECT, PULSE, ZIG-ZAG and ALERT keys transfer execution to the appropriate module.

Zig-Zag Mode (ZZMD). Executes when the unit is in Zig-Zag Mode to run the selected zig-zag sequence and sense key pressings. The ZONE 1–4 keys transfer to SLMD with the selected zone enabled, and the WAVE, PULSE, SELECT, and ALERT keys transfer to WVMD, PLMD, SLMD, and ALERT, respectively.

Test Mode (TSMD). Executes after the test mode enable key sequence is entered and POWER is pressed. The module resets a demo flag and enters a program sequence that tests the heaters, motors and LEDs by cycling through all implemented combinations of a master set of the enabled functions. The test mode skips those functions of the master set that are not implemented, preferably according to parameters previously loaded into electrically programmable memory of the system 10 as described above and more fully in the above-referenced patent application. When the test is complete, the demo flag is tested and the massage transducers and heaters are turned off with execution proceeding at MPRS if the demo flag was zero.

Demonstration Mode (TSMD). After the demonstration mode enable key sequence is entered and POWER is pressed, control is transferred to the TSMD program sequence with the demo flag set, thereby causing the test program sequence to be continuously repeated until the POWER button 46 is again pressed.

The stimulation modes (alert, alarm, and signal), which are implemented generally as described above, supercede the massaging modes, massaging modes that are interrupted by a stimulation mode being resumed when no stimulation mode is active. Also, the signal mode does not necessarily completely supercede an active massaging mode, but preferably modifies that mode.

Experimental Prototype

With further reference to FIGS. 4A, 4B, 5A, 5B, and 6, an experimental prototype of the tactile alert system 10 has been built and operated, the prototype system being a modification of a massaging system as disclosed in the above-referenced copending patent application. In the prototype system 10, there is a single microcomputer chip, an MCU 110 that is in the control wand 36, the MCU 110 being in serial communication with a shift register 130 in the electronics module 37, the shift register being a simplified counterpart of that disclosed in the above-referenced copending application. Thus the wand 36 of the prototype configuration includes simplified counterparts of the key matrix 112, the status matrix 114, a serial EEPROM 116 for facilitating configuration set-up and initializing of the system, and a power reset circuit 117, but with a pair of matrix row lines (OPP40 and OPP41), and a pair of matrix column lines (KC0* and KC1* being tapped into and brought out through the cable 38 for use as described below, the cable 38 being augmented to a total of 13 wires. As shown in FIG. 4A, the MCU 110 is operated at 5-volts, being clocked using a conventional 4 Mhz crystal. The power-on reset circuit 117 has a negative going trip point set to approximately 4.0 V as described in the above-referenced patent application. Certain keys and LEDs of the unmodified system (PGM, SWL, and MUS keys, and PROGRAM and SWELL LEDs) were disabled and others (zone 5, CIR, SWU, SWD and LO keys; and MUSIC and HEAT2 LEDs) were not enabled (by suitably loading the EEPROM 116 as described in the above-referenced pending application).

As shown in FIGS. 5A and 5B, the electronics module 37 of the experimental prototype configuration includes motor drivers 118 for activating corresponding ones of the vibrators 12 (FIG. 5B), a heater driver 120 for powering the heater 16, and a 5-volt power regulator 134 (FIG. 5A) for powering the MCU 110 of the wand 36 and logic circuitry of the electronics module 37. The source power operating voltage is nominally 12–14 V DC, which is typically provided from the electrical system of the vehicle 11.

The SDT* and SCK* signals are data and clock outputs from the MCU serial I/O port of the wand 36. During a byte transfer, the data changes on the negative edge of SCK* and is clocked into the shift register on the positive edge of SCK*. The clock period is 1 $\mu$s. The data from the MCU is serially transmitted in negated form. The signal DST* is the data strobe that transfers the shift register data to the output register of the shift register 130, which can be a conventional 74HC4094 integrated circuit). The transfer is enabled while DST* is low. Each update of the shift register 130 consists of transmitting one data byte and then pulsing DST* low for 2 $\mu$s. Each negative edge of the DST* triggers a re-triggerable pulse generator of the timer circuit 138 which enables the 74HC4094 output drivers. If the MCU 110 stops updating the shift register, the timer circuit 138 times out, disabling drive signals to the motor and heater drivers 118 and 120. This is a safety feature that protects against unwanted operation in case of MCU failure. As shown in FIG. 5A, the heater driver 120 is driven from the SCK* signal as buffered by the Schmitt trigger circuit 136 and gated by the output of the timer circuit 138. The heater 16 is driven directly from the power source, the driver 120 being configured as a buffered saturated transistor switching circuit. Heat level is controlled by pulse width modulation of the signals applied to the driver as described above.

Motor and heater control is performed using pulse width modulation (PWM) as described above, As shown in FIG. 5A, timer 138 which utilizes a portion of the Schmitt trigger circuit 136 is employed to automatically disable all drivers if a communication is not received at least once every 100 milliseconds. This protects the user in the event the control wand 36 becomes disconnected while power is applied to the electronics module 37. The module 37 also includes a panel connection 132 for extending some of the conductors of the cable 38 to a remote location as described below.

Remote Test Panel

The experimental prototype of the alert system 10 has a remote test panel 180 for simulating functions of the VPU 43 and the vehicle buss 44 as shown in FIG. 6. The test panel 180, which is coupled to the panel connection 132 by a counterpart of the interface cable 42, includes remotely located portions of the key matrix 112 and the system status matrix 114. More particularly, the test panel 180 includes a counterpart of the alert button 90, designated wake-up (WU) key 182 and having a LED 183 associated therewith, an alarm (AX) key 184 having a LED 185 associated therewith, a left turn (L) key 186 having a LED 187 associated therewith, and a right turn (R) key 188 having a LED 189 associated therewith. The LEDs 188 and 189 are counterparts of the LEDs 92L and 92R of the wand 36 as described above in connection with FIG. 2. The AX key 184 is programmed for simulating the alarm condition, a second press terminating the simulated condition. The above elements are wired to the OPP40*, OPP41*, KCO*, KC1*, LCO*, and LC1* signals from the wand 36 as shown in FIG. 6 to form extensions of the key matrix 112 and the status matrix 114.

Regarding the control programming of the MCU 110, the experimental prototype was programmed for providing the above-described stimulation and massaging modes using a modification of the program listed in Appendix A of the above-referenced copending patent application, the modified program being listed in Appendix A herein. More particularly, the modifications include the following:

The Alert Mode: The alert mode was implemented to be responsive to the WU key 182 with activation of the wake-up LED 183. The five above-described alert stimulation cycles were implemented with the duration of each active portion and each inactive portion being 15 seconds, each active portion being at maximum intensity and speed. A second press deactivates the alert mode, returning the system 10 to a power off condition, or to a previous massaging mode, if the massaging mode was interrupted by the alert mode. It will be understood that in typical implementations, control can be returned to a signal mode that was interrupted by the alert mode, or the alert mode can be temporarily modified by the signal mode.

The Alarm Mode: The alarm mode was implemented to be responsive to the AX key 184, commencing simulation corresponding to the pulse massaging mode and activation of the alarm LED 185, with the four zones 26, 28, 30, and 32 active and at maximum intensity and speed. A second press of the AX key terminates the alarm mode, returning the system to a power off condition. It will be understood that in ordinary implementations, the alarm mode is terminated by absence of an alarm signal, and that control can be returned to a massaging or signal mode that was interrupted by the alarm mode.

The Signal Mode: The signal mode was implemented to be responsive to the L key 186 and the R key 188, commencing simulation corresponding to the pulse massaging mode and activation of the corresponding LED 188 or 189. The appropriate left or right vibrators of the four zones 26, 28, 30, and 32 are activated at a speed of 78 pulses per minute for corresponding to a typical turn signal flashing rate. The intensity is set to approximately 60 percent of the difference between the maximum and minimum intensity limits of the system. Pressing the opposite key during the signal mode switches the activations to the opposite side. In the experimental prototype, a second press of the same key terminates the signal mode, returning the system to the power off condition. It will be understood that in ordinary implementations, the signal mode is terminated by the absence of a signal input 127, and control can be returned to a previously interrupted massaging mode.

Drowsiness Query:

Optionally, the system 10 can be implemented to periodically activate the vibrators 12 with a short burst for querying the driver to evaluate his state of alertness and whether or not the alert mode is needed. The time between activations (one, two, three, or five minute intervals, for example) and the duration of activation (0.2–1.0 second, for example) can also be controlled by the driver, using multiple touch aspects of the ALERT button 90 in combination with the SPEED toggle switch. The driver can issue a negative response by a single pressing of the ALERT button 90; otherwise, the alert mode is entered. In a further aspect, the system 10 can request the driver to perform simple tasks to confirm alertness and/or to determine the extent to which alertness has deteriorated, by comparison with similar data collected when the driver is fully alert. The request can be auditory of visual, and the tasks can include requested key press sequences on the wand 36 or on a cellular telephone, if present.

Alert Time-out:

After prolonged use of the alert mode, it is possible that its effectiveness would wear out. Thus the system 10 can be implemented for forcing the driver to take a rest after the alert mode has been activated for an appropriate predetermined time limit such as 30 minutes. More particularly, appropriate STATUS signals to the VPU 43 can activate brake lights of the vehicle 11; followed by, after a short interval of 30 seconds or less, gradually limiting fuel flow for forcing slowing of the vehicle; and activation of emergency flashing lights of the vehicle. Thus the driver is prevented from continuing to drive indefinitely while drowsy, and those in nearby vehicles are warned of potential danger. Further optional responses are activation of the vehicle horn or other obnoxious sounder, and/or operating the vehicle radio very loud.

Directional Alarm Stimuli:

With further reference to FIGS. 7–9, an alternative configuration of the system, designated 10', provides directionally oriented alarm stimuli in response to particular external conditions. For example, the system 10' can be implemented for receiving, along with the warning signal associated with the COLLISION condition, described above as being signaled to the vehicle microprocessor 43 from a radar device, a relative heading direction to the obstacle creating the offending condition. By correspondingly directionally orienting tactile stimulus to the driver 25, the driver is more easily able to visually identify the offending object and take effective corrective action. As shown in FIG. 7, the system 10' further includes an arrangement of the vibrators that is effective to impart directionally oriented stimuli to the driver 25. More particularly, counterparts of the vibrators, designated 12', are spaced along a cuff assembly 190 that is attached to a seat belt 192 of the vehicle 11, the cuff assembly lying generally in a horizontal plane together with the vibrators 12 of the second (lower back) zone 28 of the seat 15. Thus a combination of one pair of the vibrators 12 in the back section 20 of the seat and the vibrators 12' of the cuff assembly 190 surround an abdominal portion of the driver 25. The vibrators 12' of the cuff assembly 190 are also individually designated MBL, MBLF, MBFL, MBF, MBFR, MBRF, and MBR, from left to right. Selective activation of one or more of these vibrators and of the vibrators 12 of the second zone 28 is effective for providing a directional stimulus to the driver 25 as described below. Additionally, counterparts of the vibrators 12' are preferably included in the second zone 28 of the seat 15 to provide improved directional sensory perception. The vibrators 12' of the second zone 28, if present, are designated M2LL, M2LC, M2CL, M2CR, M2RC, and M2RR.

As shown in FIG. 8, a counterpart of the electronics module, designated 37', is configured for receiving directionally distinct warning signals for correspondingly activating the pair of vibrators 12 in the lower back zone 28 and the spaced plurality of the vibrators 12' of the cuff assembly 190 for tactile communication of both a warning and an associated heading to the driver 25. More particularly, the MCU 111 is configured for receiving plural counterparts of the warning signal 126, designated front (FT) 126A, rear (RR) 126B, right (RT) 126C, and left (LT) 126D, respectively. Also, the motor drivers 118 are configured for individually activating the vibrators 12', in addition to the vibrators 12. Further shown in FIG. 8 is a power boost circuit 150 for operation of the vibrators 12 (and the vibrators 12') at augmented intensity in the alert and/or alarm modes of the system 10'. The boost circuit 150 provides a +12B power output that is at substantially the same as that of a 12-volt power source voltage of the system during any of the massaging modes, being activated by a signal from the MPU 110 for raising the +12B output to approximately 20 volts, preferably during each of the alert and alarm modes. It will be understood that the boost circuit 150 is also preferably implemented in the circuit configuration of FIG. 3 of the system 10.

As best shown in FIG. 9, the cuff assembly 190 includes a flexible sleeve 194 enclosing the vibrators 12' and a lap portion of the seat belt 192, each vibrator 12' including a cup-shaped housing 196 having a solenoid coil 198 rigidly supported therein with a magnetically permeable stator member 199, and an armature assembly 200 that movably projects through a central opening 202 of the housing 196 for stimulating the driver 25. The armature assembly 200 includes a magnetically permeable disk member 204 that is rigidly connected to a non-magnetic stem member 205 having a head portion 206 that slidably projects through the opening 202. The sleeve 194 is formed from a flexible fabric sleeve member 207, the sleeve member being folded and joined by a seam 208 along a marginal edge thereof to form a pocket 209 enclosing the vibrators 12', a portion of the sleeve member extending beyond the seam 208 to form a first flap 210 that at least partially encloses the seat belt 192. A second flap 211 is fastened to the sleeve member 207, the second flap also being formed of flexible fabric for completing the enclosure of the belt 192 by overlapping the first flap 210, respective hook and loop fastener elements 212 and 213 being fastened to the flaps 210 and 212 for securing the sleeve 194 to the seat belt 192.

The housing 196 of each vibrator 12' is formed with an outwardly facing flange portion 214 by which the vibrators 12' are fastened in spaced relation along the sleeve member 207, facing away from the seat belt 192. Each armature assembly 200 is thus confined within the housing, the disk member 204 being biased toward the seat belt 192 by a helical compression spring 215. Thus the disk member 204 assumes a position contacting the sleeve member 207 and spaced from the stator member 199 when the solenoid coil 198 is not energized. Activation of the coil 198 drives the disk member 204 against the stator member 199, with corresponding compression of the spring 215 and movement of the head portion 206 of the stem member 205 outwardly from the housing 196, to locally stimulate the driver 25 by deflecting a portion of the sleeve member 207. A resilient filler member 216 having openings for receiving the vibrators 12' is also located within the pocket 209 for smoothly shaping the sleeve member 207 between the seat belt 192 and the driver 25. The vibrators 12' are individually selectively powered through a cuff cable 218 that extends from the cuff assembly 190 toward an anchored portion of the seat belt 192, the cable being suitably connected to a counterpart of the electronics module 37. In the case of the vibrators 12' having the solenoid coils 198 as described herein, vibratory stimuli are produced by pulsed activation at a desired frequency being sufficiently low to permit an effective axial movement of the armature assembly 200. The pulsed activation can be by circuitry of the driver 118; however, it is contemplated that the pulsed activation be produced by intermittent signals transmitted from the MCU 111 as defined by the firmware in a conventional manner.

In an exemplary configuration of the system 10', the directional aspect of the stimuli resulting from the warning signals 126 is controlled by a table look-up module of the firmware, using known programming devices, as indicated in the following Table 1. The table look-up operates as a translator for converting any of the directionally oriented combinations of the warning inputs 126 to corresponding activations of appropriate ones of the vibrators in the second zone 28, with a counterpart of the previously described Alarm mode being entered. It will be understood that the exemplary configuration of Table 1 utilizes only nine out of the sixteen possible states of the four warning signals 126 to signal one of eight directional orientations of the COLLISION condition. One or more of the seven remaining states can be reserved for others of the warning conditions (overheating, etc.). For example, simultaneous activation of all of the warning inputs 126 can be interpreted by the firmware as non-directional, the Alarm mode proceeding as previously described in connection with the configuration FIG. 3 having the single warning input 126.

TABLE 1

Directional Stimulus Logic

| Input | Status | | | | | | | | | Output |
|---|---|---|---|---|---|---|---|---|---|---|
| FT | 0 | 0 | 0 | 1 | 1 | 1 | 0 | 0 | 0 | |
| RR | 0 | 1 | 0 | 0 | 0 | 0 | 0 | 1 | 1 | |
| RT | 0 | 0 | 0 | 0 | 1 | 1 | 1 | 1 | 0 | |
| LT | 0 | 1 | 1 | 1 | 0 | 0 | 0 | 0 | 0 | |
| Symbol | ↙ | ← | ↖ | ↑ | ↗ | → | ↘ | ↓ | | |
| | | | | | | | | 1 | 1 | M2CL |
| | 1 | | | | | | | | 1 | M2L |
| | 1 | 1 | | | | | | | | M2LC |
| | 1 | 1 | | | | | | | | M2LL |
| | | 1 | 1 | | | | | | | MBL |
| | | 1 | 1 | | | | | | | MBLF |
| | | | 1 | 1 | | | | | | MBFL |
| | | | | 1 | | | | | | MBF |
| | | | | 1 | 1 | | | | | MBFR |
| | | | | | 1 | 1 | | | | MBRF |
| | | | | | | 1 | 1 | | | MBR |
| | | | | | | | 1 | 1 | | M1RR |
| | | | | | | | 1 | 1 | | M1RC |
| | | | | | | | | 1 | 1 | M2R |
| | | | | | | | | | 1 | M2CR |

In Table 1, the symbols ↙, ←, ↖, ↑, ↗, →, ↘, and ↓ represent relative headings of −135°, −90°, −45°, 0, 45°, 90°, 135°, and 180° to a hazard. It will be understood that other forms of addressing particular combinations of the vibrators to obtained additional indications of direction are possible. For example, unused remaining states of the warning inputs 126 can activate additional combinations of the vibrators for further directional aspects of stimulation, one such further aspect being implemented by activating the vibrators MBLF, MBFL, and MBF for signaling a hazard at a relative heading of approximately −22.5°. This six of the unused states can provide indications of −112.5, −67.5°, −22.5°, 67.5°, and 112.5°. It will be understood that if six of the seven unused states are thus used, a different means for signaling a non-directional warning would be required, such as an additional warning signal 126. In that case, there are 32 possible states of the warning signals 126, which could be applied to 16 directional aspects and up to 15 functional specific warnings to be signaled by corresponding patterns of activation vibrators 12.

In an alternative configuration wherein the vibrators 12' are provided in the seat belt 192 only (and not in the seat in addition to the vibrators 12 of the second zone 28), the directional aspect of the stimuli resulting from the warning signals 126 can be as indicated in the following Table 2:

TABLE 2

Directional Stimulus Logic, Alternative Config.

| Input | Status | | | | | | | | | Output |
|---|---|---|---|---|---|---|---|---|---|---|
| FT | 0 | 0 | 0 | 1 | 1 | 1 | 0 | 0 | 0 | |
| RR | 0 | 1 | 0 | 0 | 0 | 0 | 0 | 1 | 1 | |
| RT | 0 | 0 | 0 | 0 | 0 | 1 | 1 | 1 | 0 | |
| LT | 0 | 1 | 1 | 1 | 0 | 0 | 0 | 0 | 0 | |
| Symbol | ↙ | ← | ↖ | ↑ | ↗ | → | ↘ | ↓ | | |
| | 1 | 1 | | | | | | | 1 | M2L |
| | 1 | 1 | 1 | | | | | | | MBL |
| | | 1 | 1 | | | | | | | MBLF |
| | | | 1 | 1 | | | | | | MBFL |
| | | | | 1 | | | | | | MBF |
| | | | | | 1 | 1 | | | | MBFR |

TABLE 2-continued

Directional Stimulus Logic, Alternative Config.

| Input | Status | Output |
|---|---|---|
| | 1 1 | MBRF |
| | 1 1 1 | MBR |
| | 1 1 1 | M2R |

It will be understood that separate warning inputs 126 can be provided corresponding to each of the vibrators 12 and 12' in the directional plane, such as by having a counterpart of the table look-up or equivalent software in the vehicle microprocessor 43, or by the radar or other directional sensing system being implemented with output signals directly corresponding to the relative positions of the vibrators 12 and 12' to be activated in response thereto. Similarly, a counterpart of the table look-up can be provided by explicit decision logic of the firmware or by hard-wired electronic logic interposed between the warning inputs 126 and the MCU 111. In Tables 1 and 2, overlapping pluralities of the vibrators are activated in response to adjacent combinations of the warning inputs 126 for enhanced stimulation of the driver 25. Appropriate variations of the table look-up that are suitable for different numbers and positional locations of the vibrators are contemplated within the scope of the present invention.

With further reference to FIG. 10, a simplified alternative configuration of the system 10' has eight of the vibrators 10' distributed at approximate 45-degree intervals in the seat belt 192 and the back 20 of the seat 15. More particularly, five of the vibrators 12' are spaced along the belt 192, three of the vibrators 12' being laterally spaced in the seat back 20. Optionally the vibrators 12' of the seat back 20 are in the second zone 28 as in FIG. 7, laterally spaced from the vibrators 12 of that zone. In this configuration, stimuli having the directional aspect can be from the vibrators 12' without activation of the vibrators 12, which can be reserved for activation in modes not having the directional stimuli aspects, in which case the directional aspect of the stimuli resulting from the warning signals 126 can be as indicated in the following Table 3:

TABLE 3

Directional Stimulus Logic, Simplified Config.

| Input | Status | | | | | | | | | Output |
|---|---|---|---|---|---|---|---|---|---|---|
| FT | 0 | 0 | 0 | 1 | 1 | 1 | 0 | 0 | 0 | |
| RR | 0 | 1 | 0 | 0 | 0 | 0 | 0 | 1 | 1 | |
| RT | 0 | 0 | 0 | 0 | 0 | 1 | 1 | 1 | 0 | |
| LT | 0 | 1 | 1 | 1 | 0 | 0 | 0 | 0 | 0 | |
| Symbol | ↙ | ← | ↖ | ↑ | ↗ | → | ↘ | ↓ | | |
| | 1 | 2 | | | | | | | 2 | M2LL |
| | 2 | 1 | 2 | | | | | | | MBL |
| | | 2 | 1 | 2 | | | | | | MBLF |
| | | | 2 | 1 | 2 | | | | | MBF |
| | | | | 2 | 1 | 2 | | | | MBRF |
| | | | | | 2 | 1 | 2 | | | MBR |
| | | | | | | 2 | 1 | 2 | | M2RR |
| | | | | | | | | 2 | 1 | M2C |
| | 2 | | | | | | | | | |

In Table 3, activations of the vibrators 12' are at a first or primary level as signified by the numerals "1" and at a second or secondary level as signified by the numerals "2". It will be understood that the second level can be zero, in which case only one of the vibrators 12' are activated at a time. Alternatively, the second level can match the first level, in which case three of the vibrators are activated at the same intensity in each of the directional aspects. Further, the second level can be for an intermediate intensity, in which full intensity is applied in the indicated direction and reduced intensity is applied at vibrators adjacent to and on opposite sides of the indicated direction. It will be further understood that plural activation intensities can also be implemented in the configurations corresponding to Tables 1 and 2 as well.

With further reference to FIG. 11, another and preferred form of the vibrators 12', designated 12", has motor-driven eccentric weights as described above regarding the vibrators 12, but configured smaller for facilitating installation in the seat belt 192 and in otherwise unused portions of the seat 15. Devices suitable for use as the vibrators 12" are commonly used in personal telephonic paging units, having a cylindrical configuration of approximately 1.3 inches long and 0.3 inch diameter, one such device being available from Mabuchi Motor Company, LTD., Chiba-Ken, Japan. The vibrators 12", being smaller than the vibrators 12, require reduced power for operating at the same rotational speed. Higher rotational speeds are contemplated, also at reduced power. Preferably, the motors of the vibrators 12" are configured for operating at the same voltage as provided to the vibrators 12, however, for reduced complexity of the required drive circuitry. In that case, the drive circuits for the vibrators 12" can have reduced current-carrying capacity. It will be understood that motor electrical windings of the vibrators 12" can be configured for operating at suitable rotational speeds using the same source power voltage as that provided to the drivers 118 of the vibrators 12. In the alternative substituting the vibrators 12" of FIG. 11, the individual driver circuits can be the same as for the vibrators 12, but reduced current drive capacity is permitted.

Tactile Stimulation Power Boost:

With further reference to FIGS. 12 and 13 (12A, 12B, 13A, 13B, and 13C), a second experimental prototype of the tactile alert system 10 has been built and operated, the second prototype system being a modification of the previously described prototype system of FIGS. 4–6. In the second prototype system, a power boost module, designated 37' in FIG. 13C, is connected by a power boost cable 40' to the electronics module 37 as indicated in FIG. 13A. The module 37' incorporates the power boost circuit 150, it being contemplated that the modules 37 and 37' can be configured as a single unit. When activated as described herein, the power boost circuit 150 operates to raise the power supply voltage to the motor drivers 118 from a nominal 12 volts to a higher voltage to provide noticeably increased massaging and/or stimulation intensity as indicated above. More particularly, a hitherto unused interface port of the MPU 110 is connected as a voltage control signal (VCT) as shown in FIG. 12A, the VCT signal being routed through the cable 38 to the electronics module 37, and from thence through the boost power cable 40' to the boost module 37' for control thereof. The previously described power cable 40 is connected at the boost module 37' instead of the electronics module 37. As further shown in FIG. 13C, the boost module 37' includes an inductor L201 and a forward-biased diode D201 connected in series between the +12V power source (from the power cable 40) to a boost buss connection +12B that is fed through the boost power cable 40' to corresponding counterpart connections of the motor drivers 118 that were formerly connected to the +12V source in the previously described configuration of FIG. 5B. The boost module also includes a voltage multiplier integrated circuit 220 that repetitively develops a building and collapsing field across the inductor L201. The corresponding voltage across the inductor, with polarity to pass through the diode D201, additively augments the nominal 12 volts that normally appears at the boost connections +12B. Based on actual physical testing and a number of observations, a preferred boost voltage (the voltage 12B when the module 37' is activated) has been determined to be approximately 20 volts when normal massaging is done at the nominal 12 volts. In tests that have been conducted to determine the effect of the augmented boost voltage, samples of exemplary vibrators 12 were run under various loading simulative of uses installed in the pad 14, with the drivers 118' powered both at 12 volts and at 20 volts, measurements of electrical current draw and rotational speed (intensity in Hz) being as given below in Table 4.

TABLE 4

Normal and Boost Voltage Vibration Intensities

| | 12 VOLTS | | | | 20 VOLTS | | | |
|---|---|---|---|---|---|---|---|---|
| | Lightest Load | | Heaviest Load | | Lightest Load | | Heaviest Load | |
| MOTOR SAMPLE | Current | Hz | Current | Hz | Current | Hz | Current | Hz |
| A | 110 | 65 | 130 | 63 | 180 | 124 | 280 | 112 |
| B | 110 | 68 | 140 | 66 | 180 | 122 | 260 | 109 |
| C | 120 | 74 | 150 | 71 | 200 | 132 | 300 | 114 |

As indicated above, the power boost module 37' (or its counterpart in an integrated implementation) is preferably activated upon entry of the alert and/or alarm stimulation modes of the system 10, the activation continuing during specific, repetitive program sequences of vibration intensity being performed as described above in connection with the respective alert and alarm modes. Whereas the massaging modes are operational at a maximum intensity producing a vibration frequency of between 50 Hz and 70 Hz (nominally approximately 65 Hz), activation of the power boost module 37' produces a maximum intensity vibration frequency of more than 100 Hz (nominally approximately 120 Hz) during the alert and/or alarm modes In the second prototype implementation described herein, a counterpart of the key matrix, designated 112', is of abbreviated configuration, controlling four zones (1–4) and four modes (select, pulse, wave, and zig-zag), and having a single heater key. Additionally, the matrix 112' includes a tactile key K215 for simulating the wake-up and alarm keys 182 and 184 of FIG. 6. As before, it will be understood that the alert and alarm modes are normally entered in response to signals from the vehicle microprocessor 43 or equivalent means, notwithstanding the optional presence of corresponding keys on the wand 36 for user-initiated activation of the respective modes.

With further reference to FIG. 14, the system 10' of FIG. 10 has application in a counterpart of the vehicle, designated 11', being a watercraft, wherein the seat 15 is for a pilot of the watercraft. It will be understood that the vehicle 11 can be a maritime vessel or a private craft. The present invention also encompasses the system 10' being applied to aircraft, both for the pilot and crew members. The watercraft of FIG. 14 is provided with a counterpart of the steering wheel, designated helm wheel 140', and a radar system including a radar antenna 160. As shown in FIG. 14, the radar system is operative for detecting a hazard vessel 222 moving on a collision course with the watercraft 11', the system 10' being responsive to the radar system as described above for activating particular ones of the vibrators 12' for signaling the approximate heading to the hazard vehicle 222. In addition, the radar system can provide a range signal, the COLLISION condition being activated when the range signal drops to a predetermined threshold which can be a function of the heading. In the situation of FIG. 14, the hazard vehicle is at a relative heading of starboard approximately 20 degrees. In the previously described examples of the directional stimulus logic having eight directional orientations of the COLLISION condition, the heading of 20 degrees to starboard being approximated by "dead ahead." In the alternative having the additional orientations of −112.5°, −67.5°, −22.5°, 22.5°, 67.5°, and 112.5°, the heading to the hazard vehicle is closely approximated by the indication of 22.5 degrees, being signaled by activation of an appropriate pair of the vibrators 12' as indicated at 225 in FIG. 14. A non-directional COLLISION warning can also be responsive to a depth-sounding detector.

Thus it is believed that the system 10 of the present invention provides an improved "man-machine" interface that is effective for both improving and maintaining an alertness state of the driver 25, as well as for calling attention to alarm and signal conditions without requiring visual or aural stimulation of the driver. Thus the present invention provides an effective and low cost remedy for alleviating conditions of drowsiness and/or inattention of vehicle and other equipment operators. Suitable vehicles for which the system 10 is appropriate include automobiles, aircraft, trucks, and ships, as well as tractors and other heavy equipment and agri-machinery. Also, when such vehicles are components of "smart" transportation systems, the present invention provides improved communication with drivers whether or not they are actually controlling their vehicles, such as by utilizing signals from roadway tracking detectors. Further, the system 10' having the seat belt cuff assembly 190 additionally provides directionally oriented warning stimuli to the driver in response to external signals, thereby enabling the driver to more quickly and effectively respond to conditions triggering the signals (such as an impending collision) by immediately directing attention in the signaled direction without having to look at a visual display. Moreover, in-home massaging devices, for seating, bedding, etc. can be implemented with to alarm mode being responsive to smoke detectors, $CO_2$ detectors, security breach detectors, and/or infant distress detectors, the alert mode also being effective as a snore deterrent.

Although the present invention has been described in considerable detail with reference to certain preferred versions thereof, other versions are possible. For example, other types of transducers, including force and displacement actuators, can be used for deforming the massage pad 14; also, pneumatic actuators can replace the solenoid-type vibrators 12' of FIG. 8. Also, the system 10 can be interfaced with a global position satellite (GPS) facility for locating the vehicle and contacting the driver by phone with directions to a nearby hotel, gas station, rest stop, etc. Further, the GPS facility can have a touch-screen for receiving driver input in response to the drowsiness inquiry. Therefore, the spirit and scope of the appended claims should not necessarily be limited to the description of the preferred versions contained herein.

What is claimed is:

1. A tactile alert system for an occupant support structure, comprising:
    (a) a plurality of vibratory transducers for location in plural zones of the support structure, wherein the support structure includes a pad for contacting a portion of an occupant, at least some of the vibratory transducers being imbedded in the pad;

(b) a seat belt for restraining the occupant, wherein at least some of the vibratory transducers are supportable outside of the pad in longitudinally spaced relation proximate the seat belt;

(c) a driver circuit for powering each of the transducers in response to a corresponding drive signal; and (d) a controller responsive to external conditions for selectively activating the drive signals in a predetermined sequence of alert stimulation cycles of sufficient duration, frequency, and intensity for selectively stimulating muscle groups of the occupant of the structure, successive alert stimulation cycles differing in at least one of intensity, frequency, and transducers activated, thereby to alert the occupant of the particular condition and to improve the occupant's alertness.

2. The tactile alert system of claim 1, wherein the alert stimulation cycles each have an active portion and at least some of the alert stimulation cycles have an idle portion.

3. The tactile alert system of claim 2, wherein the active portion durations are between 1 second and 15 seconds, and the idle portion durations are between 5 seconds and 45 seconds.

4. The tactile alert system of claim 2, wherein the stimulation cycles selectively include a pulse stimulation cycle wherein the controller activates the drive signals in spaced interval portions of the active portions.

5. The tactile alert system of claim 4, wherein the interval portions have an interval duration being between 0.1 second and 1.0 seconds, activated ones of the transducers producing a vibration frequency of at least 50 Hz in each of the alert stimulation cycles.

6. The tactile alert system of claim 5, wherein the vibration frequency in at least some of the alert stimulation cycles is greater than 80 Hz.

7. The tactile alert system of claim 4, comprising respective left and right transducers in at least some of the zones, and wherein the alert stimulation cycles further include at least one stimulation cycle selected from the group consisting of an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

8. The tactile alert system of claim 2, wherein the successive alert stimulation cycles further differ in at least one of active portion duration and idle portion duration.

9. The tactile alert system of claim 8, wherein the active portion duration is between 1 second and 10 seconds, and some of the idle portion durations are between 5 seconds and 15 seconds, others of the idle portion durations being between 15 seconds and 45 seconds.

10. The tactile alert system of claim 9, wherein the active portion duration is approximately 5 seconds, the idle portion durations alternating between approximately 10 seconds and approximately 25 seconds.

11. The tactile alert system of claim 1, comprising respective left and right transducers in at least some of the zones, and wherein the stimulation cycles include at least one stimulation cycle selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

12. The tactile alert system of claim 11, wherein the alert stimulation cycles include at least three members of the group.

13. The tactile alert system of claim 1, wherein the external conditions includes an alert input selected from the group consisting of a manual actuator input, a bodily function sensor input, a manual control sensor input, and an external system signal.

14. A tactile alert system for a user support structure, comprising:

(a) a first vibratory transducer for location in the support structure, wherein the support structure includes a pad for contacting a portion of a user, the first vibratory transducer being imbedded in the pad;

(b) a seat belt for restraining the user, having a second vibratory transducer supportable outside of the pad in longitudinally spaced relation proximate the seat belt;

(c) a driver circuit for powering the first vibratory transducer and the second vibratory transducer in response to a drive signal; and (d) a controller responsive to external conditions for selectively activating the drive signal in a predetermined sequence of alert stimulation cycles of sufficient duration, frequency, and intensity for stimulating muscle tissue of the user of the structure thereby to alert the user of the particular condition and to improve the user's alertness, each alert stimulation cycle having an active portion and an idle portion, wherein successive alert stimulation cycles differ in at least one of the intensity, frequency, active portion duration, and idle portion duration.

15. The tactile alert system of claim 14, wherein the active portion durations are between 1 second and 15 seconds, and the idle portion durations are between 5 seconds and 45 seconds.

16. The tactile alert system of claim 14, wherein the external conditions includes an alert input selected from the group consisting of a manual actuator input, a bodily function input, a manual control sensor input, and an external system signal.

17. The tactile alert system of claim 16, further comprising a radio receiver having an output for communicating the bodily function input in response to a remote bodily function sensor.

18. The tactile alert system of claim 17, further comprising a sensor unit including:

(a) a carrier having means for attachment to a body member of the user;

(b) a sensor transducer supported by the carrier for generating a sensor signal corresponding to a bodily function of the user, the sensor transducer being selected from the group consisting of a blood pulse sensor, a blood pressure sensor, a body temperature sensor, and an EEG sensor;

(c) a radio transmitter supported by the carrier for communicating the sensor signal to a radio receiver.

19. The tactile alert system of claim 14, further comprising a plurality of input elements connected to the controller for signaling operator input, the signaling including signals for setting a plurality of massaging modes and signals for setting an intensity control value, the tactile alert system also having an alert mode incorporating the alert stimulation cycles, and signals for setting an intensity control value, wherein the controller activates the drive signals at maximum intensity during at least a portion of the alert mode, and at adjustable intensity corresponding to the intensity control value in at least one of the massaging modes, wherein the alert mode operates independently of the intensity control value.

20. A tactile alert system for an operator-driven vehicle having a seat for supporting a driver of the vehicle, the system comprising:
  (a) a plurality of vibratory transducers for location relative to plural zones of the seat, each transducer being responsive to a transducer power signal;
  (b) a microprocessor controller having program and variable memory and an input and output interface;
  an array of input elements connected to the input interface for signaling the microprocessor controller in response to operator input, the signaling including an intensity control value, a plurality of mode signals, and a plurality of region signals relating transducers to be enabled;
  (d) a driver circuit responsive to the output interface for producing, separately for each of the transducers, the power signal; and
  (e) the microprocessor controller being operative in response to the input elements for activating the transducers for operation thereof in a plurality of modes including:
    (i) a massaging mode selectively producing activation of drive signals in response to the input elements at an adjustable intensity corresponding to the intensity control value for soothingly massaging muscle groups of the driver; and
    (ii) an alert mode producing a predetermined sequence of alert stimulation cycles in response to external input and independently of the intensity control value, each alert stimulation cycle having an idle portion of between 1 second and 30 seconds, and an active portion of sufficient duration, frequency, and intensity for selectively stimulating the muscle groups of the driver thereby to improve the driver's alertness, wherein successive alert stimulation cycles differ in at least one of the intensity, frequency, active portion duration, and idle portion duration enabled,
  wherein the driver circuit produces a first limiting magnitude of the power signal in the massaging mode and a second limiting magnitude of the power signal in the alert mode, the second limiting magnitude being greater than the first limiting magnitude,
  wherein the tactile alert system includes an external electrical power having a source voltage, such that the driver circuit is powered substantially at the source voltage in the massaging mode, and
  wherein the tactile alert system further includes a power boost circuit for powering the driver circuit at a boost voltage in the alert mode, such that the boost voltage is greater than the source voltage.

21. The tactile alert system of claim 20, wherein the boost voltage is at least 50 percent greater than the source voltage.

22. The tactile alert system of claim 20, wherein the external electrical power is DC, and the power boost circuit comprises an inductor and a diode series connected between the driver circuit and the external electrical power, and a pulse circuit connected between the inductor and the diode, the pulse circuit being activated during the alert mode.

23. The tactile alert system of claim 20, wherein the active portion durations are between 1 second and 30 seconds.

24. The tactile alert system of claim 20, comprising respective left and right transducers in at least some of the zones, and wherein the alert stimulation cycles include at least three stimulation cycles selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

25. The tactile alert system of claim 24, wherein the alert stimulation cycles include the pulse stimulation cycle wherein the interval portions have an interval duration being between 0.1 second and 1.0 seconds, activated ones of the transducers producing a vibration frequency of at least 50 Hz in each of the alert stimulation cycles.

26. The tactile alert system of claim 25, wherein the vibration frequency in at least some of the alert stimulation cycles is greater than 80 Hz.

27. The tactile alert system of claim 20, wherein the external input includes an external signal selected from the group consisting of a bodily function sensor input, a manual control sensor input, and an external system signal.

28. The tactile alert system of claim 27, wherein the external input further includes a manual actuator input, the microprocessor controller activating the alert mode in response to the manual actuator input.

29. The tactile alert system of claim 27, wherein the external signal includes the bodily function input, the microprocessor controller detecting a predetermined threshold condition of the bodily function input and activating the alert mode in response thereto.

30. The tactile alert system of claim 27, wherein the external signal includes the manual control sensor input, and the microprocessor controller activates a predetermined subset of the transducers corresponding to the manual control sensor input.

31. The tactile alert system of claim 30, wherein the manual control sensor input is a hand grip sensor signal, the microprocessor controller detecting a predetermined threshold condition of the hand grip sensor signal and activating the alert mode in response thereto.

32. The tactile alert system of claim 27, wherein the external signal includes the external system signal, and the microprocessor controller activates a predetermined subset of the transducers corresponding to the external system signal.

33. The tactile alert system of claim 32, wherein the external system signal includes a left turn signal and a right turn signal, the microprocessor controller activating respective left and right ones of the transducers in response to the left and right turn signals.

34. The tactile alert system of claim 32, wherein the external system signal is an alarm signal for activating an alarm mode in response thereto, wherein the transducers are activated in a manner sufficiently differing from other modes for the driver to identify occurrence of the alarm mode.

35. The tactile alert system of claim 34, wherein the microprocessor controller includes program instructions for excluding activation of any other mode during the alarm mode.

36. The tactile alert system of claim 34, wherein the microprocessor controller includes program instructions for resuming a previously selected mode upon termination of the alarm mode.

37. The tactile alert system of claim 34, wherein the external system signal includes a quantity signal of the group consisting of a coolant temperature signal, an oil pressure signal, a battery voltage signal, a tire pressure signal, a hazard range signal, and a fuel quantity signal, the alarm signal being activated in response to a predetermined threshold condition of the quantity signal.

38. The tactile alert system of claim 32, wherein the external system signal includes a directionally oriented warning signal having respective front, rear, right, and left directional components, the system including a belt assembly for enclosing and restraining a torso portion of the driver and having a longitudinally spaced belt subset of the transducers being locatable generally in a directional plane containing a laterally spaced back pair of the transducers being located in the seat, the back pair in combination with the belt subset of the transducers forming a ring subset surrounding the driver's torso when the belt assembly is in place, the microprocessor controller operative for activating particular ones of the ring subset in response to the warning signal thereby to directionally stimulate the driver in correspondence with the directional components.

39. The tactile alert system of claim 20, wherein the modes include at least two members of a mode signal group consisting of a select signal, a pulse signal, a wave signal, and a zig-zag signal, the microprocessor controller being operative in response to the signals of the mode signal group, respectively, for correspondingly activating:
   (a) the transducers in enabled zones corresponding to the signals in a select massaging mode;
   (b) the enabled transducers in spaced intervals of time in a pulse massaging mode;
   (c) the enabled transducers in sequential zones in a wave massaging mode; and
   (d) alternating left and right ones of the transducers in sequential zones in a zig-zag massaging mode.

40. The tactile alert system of claim 39, wherein the signals further includes a speed input for determining a rate of sequencing mode component intervals, and wherein, during at least one of the massaging modes, the duration of operation in sequential activation of mode segments is responsive to the intensity control value.

41. The tactile alert system of claim 20, wherein the input elements further define a heat control input, the system further comprising:
   (a) a heater element in the seat;
   (b) a heater driver responsive to the output interface for powering the heater element,
   the microprocessor controller being further operative in response to the input elements for activating the heater element, and
   wherein a composite mode includes activation of the heater element.

42. The tactile alert system of claim 20, wherein the driver's seat includes a pad for contacting a portion of the user, the vibratory transducers being imbedded in the pad.

43. The tactile alert system of claim 20, wherein the microprocessor controller is operative for activating the driver circuit to produce power signals up to the first limiting magnitude in the massaging mode and the second limiting magnitude in the alert mode, the second limiting magnitude being greater than the first limiting magnitude.

44. The tactile alert system of claim 43, wherein the first limiting magnitude corresponds to a transducer vibration frequency of less than approximately 75 Hz and the second limiting magnitude corresponds to a vibration frequency of at least approximately 100 Hz.

45. The tactile alert system of claim 43, including means for connecting to a source of electrical power at a first voltage, the system further comprising the power boost circuit connected between the power source and the driver circuit for selectively powering the driver circuit at the first voltage for producing the first limiting magnitude of the power signal and at a second voltage in response to the microprocessor controller for producing the second limiting magnitude of the power signal, the second voltage being higher than the first voltage.

46. The tactile alert system of claim 45, wherein the first voltage is approximately 12 volts and the second voltage is approximately 20 volts.

47. A directionally oriented tactile alert massaging system for an operator-driven vehicle having a seat for supporting a driver of the vehicle, the system comprising:
   (a) a spaced plurality of vibratory transducers supported relative to the seat for stimulating corresponding body portions of the driver, each transducer being responsive to a transducer power signal;
   (b) a microprocessor controller having program and variable memory and an input and output interface;
   (c) an input interface for receiving an external signal indicative of a sensed condition of the vehicle, the external signal having at least one directional component corresponding to a directional aspect of the sensed condition;
   (d) a driver circuit responsive to the output interface for producing, separately for each of the transducers, the power signal; and
   (e) the microprocessor controller being operative for:
      (i) activating particular ones of the transducers in response to the external signal thereby to directionally stimulate the driver in correspondence with the directional components in a first mode; and
      (ii) selectively activating at least some of the transducers in at least one other mode for soothingly massaging the muscle tissue of the driver.

48. The tactile alert massaging system of claim 47, wherein the external signal includes respective front, rear, right and left directional components, the system further comprising a translator for activating respective subsets of the transducers in response to each of the directional components.

49. The tactile alert massaging system of claim 48, wherein the translator is operative for activating additional subsets of the transducers in response to at least one combination of the directional components from the set consisting of the front and right, rear and right, front and left, and rear and left directional components, the at least one combination signifying a directional orientation intermediate that of individual components of the combination.

50. The tactile alert massaging system of claim 48, wherein the subsets include overlapping pluralities of the transducers in response to adjacently signified directional aspects of the external signal.

51. The tactile alert massaging system of claim 47, further comprising a seat belt for restraining the driver seated in the seat, wherein directionally stimulating ones of the vibratory transducers include:
   (a) at least one of the transducers in a back zone of the seat; and (b) a longitudinally spaced plurality of the transducers proximate the seat belt.

52. The tactile alert system of claim 47, wherein the external signal is a collision warning signal, and the directional component corresponds to a heading relative to a hazard object.

53. A method for alerting a vehicle driver, comprising the steps of:
(a) providing a plurality of vibratory transducers in plural zones of a driver's seat, a seat belt having the vibratory transducers, a driver circuit connected to the driver's seat transducers and the seat belt transducers and having respective inputs for receiving corresponding drive signals, and a controller for producing the drive signals, the controller having an alert condition input;
(b) activating the alert condition input;
(c) operating the controller to produce the drive signals, in response to the alert condition input, in alert stimulation cycles of sufficient duration, frequency, and intensity for selectively stimulating muscle groups of the driver; and
(d) sequencing plural cycle segments of the alert stimulation cycles, successive cycles varying in at least one of the intensity, frequency, and duration enabled, thereby to alert the driver of the particular condition and to improve the driver's alertness.

54. The method of claim 53, wherein the operating step further comprises partitioning at least some of the cycle segments into an active portion of between 1 second and 15 seconds, and an idle portion of between 1 second and 15 seconds.

55. The method of claim 53, wherein the sequencing step comprises the further step of varying successive cycle segments in at least one of an active portion duration and an idle portion duration.

56. A method for tactile-signaling a directionally oriented external condition to a vehicle driver, comprising the steps of:
(a) supporting a spaced plurality of vibratory transducers relative to a driver's seat, at least some of the transducers being pointer transducers and spaced proximate a directional plane, wherein the pointer transducers include a laterally spaced pair of back transducers in the seat, and a plurality of belt transducers spaced along a driver-restraining seat belt of the seat and including a left-front vibrator and a right-front vibrator;
(b) providing a driver circuit connected to the transducers and having respective inputs for receiving corresponding drive signals, and a controller for producing the drive signals, the controller having a condition input for responding to the external condition and an associated direction thereof;
(c) activating the condition input;
(d) translating the condition input for enabling a directionally oriented subset only of the pointer transducers; and
(e) operating the controller to produce the drive signals, in response to the condition input, in alarm stimulation cycles of sufficient duration, frequency, and intensity for selectively stimulating muscle groups of the driver, thereby to appraise the driver of the existence and orientation of the external condition.

57. The method of claim 56, wherein the condition input includes front, rear, right, and left directional components, and wherein the step of translating the condition input comprises enabling the left-front vibrator when the front and left directional components are activated, enabling the right-front vibrator when the front and right directional components are activated, enabling at least one of the back transducers when the rear directional component is activated, and activating at least one of the belt transducers when the front directional component is activated.

58. The method of claim 57, wherein the step of translating the condition input comprises enabling at least one of the belt transducers and one of the back transducers when the right or left directional components are activated with the front and rear directional components deactivated.

59. The method of claim 57, wherein the step of translating the condition input comprises enabling at least one of the belt transducers and one of the back transducers when the right or left directional components are activated with the front and rear directional components deactivated.

* * * * *